US011221642B2

(12) United States Patent
Kamon et al.

(10) Patent No.: US 11,221,642 B2
(45) Date of Patent: Jan. 11, 2022

(54) MANIPULATING DEVICE

(71) Applicant: KAWASAKI JUKOGYO KABUSHIKI KAISHA, Kobe (JP)

(72) Inventors: Masayuki Kamon, Akashi (JP); Hideyuki Ryu, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 174 days.

(21) Appl. No.: 16/614,045

(22) PCT Filed: May 15, 2018

(86) PCT No.: PCT/JP2018/018800
§ 371 (c)(1),
(2) Date: Nov. 15, 2019

(87) PCT Pub. No.: WO2018/212197
PCT Pub. Date: Nov. 22, 2018

(65) Prior Publication Data
US 2020/0073432 A1 Mar. 5, 2020

(51) Int. Cl.
G05G 9/047 (2006.01)

(52) U.S. Cl.
CPC .......... G05G 9/04737 (2013.01); G05G 2009/04774 (2013.01)

(58) Field of Classification Search
CPC ..... G05G 9/04737; G05G 2009/04774; G05G 2009/04722; G05G 2009/04733; G05G 2009/04718; B25J 9/0045; B25J 9/0048; B25J 9/0051; B25J 9/1623; B25J 9/003–0042; B25J 13/025
See application file for complete search history.

(56) References Cited

U.S. PATENT DOCUMENTS

2003/0005786 A1    1/2003  Stuart et al.
2014/0331806 A1*  11/2014  Nagatsuka .............. B25J 18/00
                                                       74/490.01
2015/0343631 A1*  12/2015  Martinez-Esponda .....................
                                                       B25J 11/005
                                                       74/490.03

FOREIGN PATENT DOCUMENTS

CN         1544209 A     11/2004
CN         1792570 A      6/2006
CN       101003133 A      7/2007
(Continued)

OTHER PUBLICATIONS

Arata et al.; "Development of Haptic Device "DELTA-4" using Parallel Mechanism"; Journal of the Robotics Society of Japan; 2009; pp. 917-925; vol. 27, No. 8.

Primary Examiner — Daniel D Yabut
(74) Attorney, Agent, or Firm — Oliff PLC

(57) ABSTRACT

A manipulating device includes a base part, a user interface disposed above the base part and having a movable part and a grip part, a parallel link mechanism having a pair of arm parts and a pair of link parts, a position sensor configured to detect a position of a base-end part of the arm part, and a controller configured to control at least one of a position and a posture of a robot based on the position detected by the position sensor. The arm part is rotatably connected at a base-end part to the base part, the link part is rotatably connected at a base-end part to the arm part, and is rotatable connected at a tip-end part to the movable part, and the base part is coupled to the movable part through three sets of parallel link mechanisms with six degrees of freedom.

8 Claims, 19 Drawing Sheets

(56) References Cited

FOREIGN PATENT DOCUMENTS

| | | | | |
|---|---|---|---|---|
| JP | 2000-148382 A | 5/2000 | | |
| JP | 2005-536703 A | 12/2005 | | |
| JP | 2009-255193 A | 11/2009 | | |
| JP | 2010-146307 A | 7/2010 | | |
| JP | 2017109270 A * | 6/2017 | ............ | B25J 9/1623 |
| WO | WO-2013084788 A1 * | 6/2013 | .............. | B25J 18/00 |
| WO | WO-2013161242 A1 * | 10/2013 | ............ | B25J 9/1623 |

\* cited by examiner

MANIPULATING DEVICE

TECHNICAL FIELD

The present disclosure relates to a manipulating device.

BACKGROUND ART

Parallel manipulators capable of operating with six degrees of freedom are known (for example, refer to Patent Document 1). The parallel manipulator disclosed in Patent Document 1 includes an end platform for supporting an object to be operated, and a middle platform disposed so as to be separated from the end platform and coupled to the end platform through a coupling element. A plurality of first links are coupled to the end platform, and a plurality of second links are coupled to the middle platform.

In the parallel manipulator disclosed in Patent Document 1, it is described that a user can grip a handle attached to the end platform, and operates the end platform like a joystick.

REFERENCE DOCUMENT OF CONVENTIONAL ART

Patent Document

[Patent Document 1] JP2005-536703A

DESCRIPTION OF THE DISCLOSURE

Problems to be Solved by the Disclosure

However, in the parallel manipulator disclosed in Patent Document 1, the first links are coupled to the end platform and the second links are coupled to the middle platform. That is, since the first links and the second links are coupled to different platforms, there is a problem that the device becomes a large size.

The present disclosure is to solve the conventional problem, and one purpose thereof is to provide a manipulating device which can be reduced in size, as compared with the conventional manipulating device.

SUMMARY OF THE DISCLOSURE

In order to solve the above problem, a manipulating device according to one aspect of the present disclosure includes a base part, a user interface disposed above the base part and having a movable part and a grip part, a parallel link mechanism having a pair of arm parts and a pair of link parts, a position sensor configured to detect a position of a base-end part of the arm part, and a controller configured to control at least one of a position and a posture of a robot based on the position detected by the position sensor. The arm part is rotatably connected at a base-end part to the base part, the link part is rotatably connected at a base-end part to the arm part, and is rotatable connected at a tip-end part to the movable part, and the base part is coupled to the movable part through three sets of parallel link mechanisms with six degrees of freedom.

Therefore, it can be reduced in the size, as compared with the conventional manipulating device.

Effects of the Disclosure

According to the manipulating device of the present disclosure, it can be reduced in the size, as compared with the conventional manipulating device.

MODES FOR CARRYING OUT THE DISCLOSURE

Figure 1:
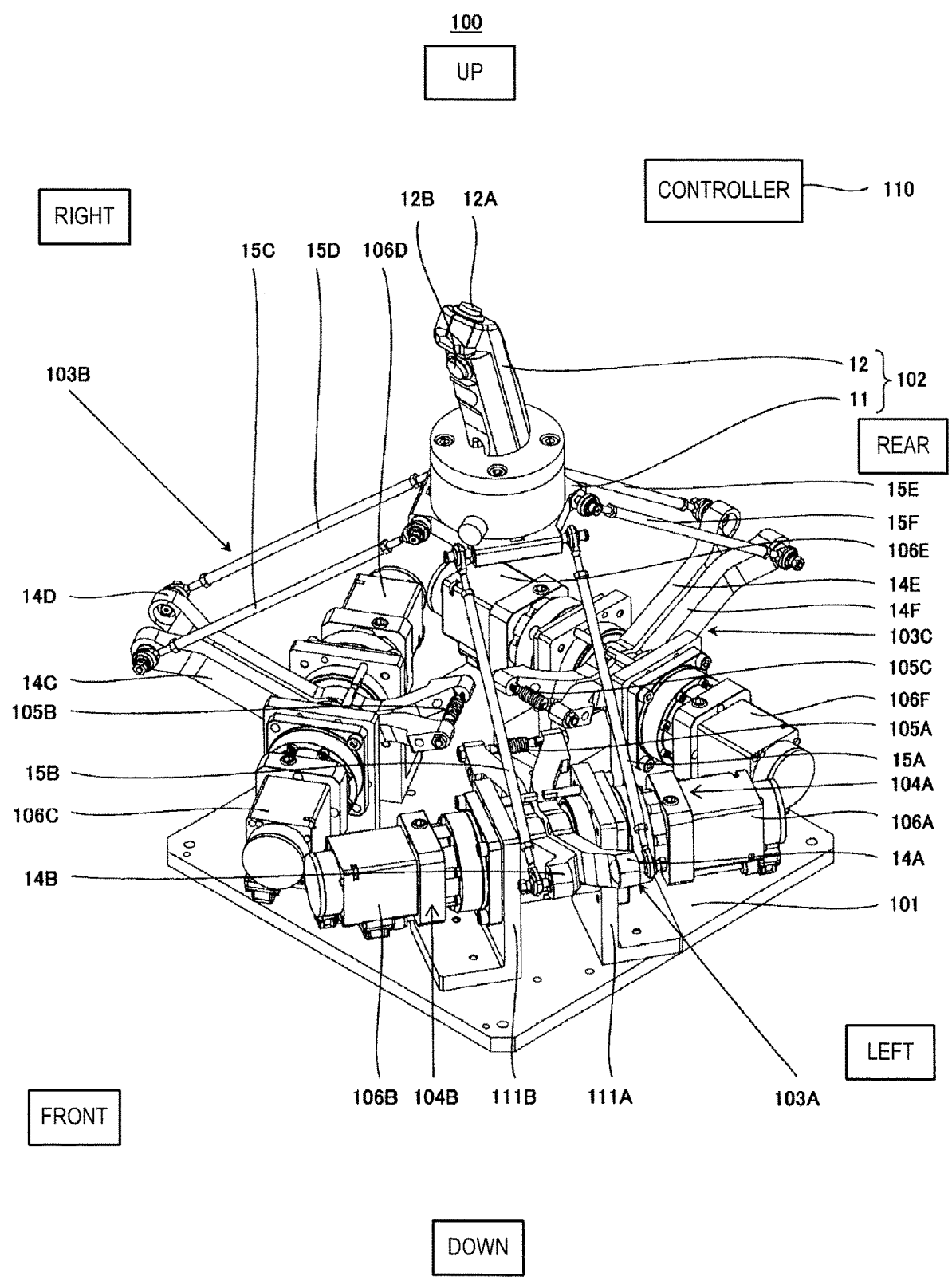
FIG. 1 is a perspective view illustrating an outline configuration of a manipulating device according to Embodiment 1.

Hereinafter, embodiments of the present disclosure will be described with reference to the drawings. Note that, throughout the drawings, the same or corresponding parts are denoted with the same reference characters to omit redundant description. Moreover, throughout the drawings, components for explaining the present disclosure are selectively illustrated, and illustration of other components may be omitted. Further, the present disclosure is not limited to the following embodiments.

Embodiment 1

A manipulating device according to Embodiment 1 includes a base part, a user interface disposed above the base part and having a movable part and a grip part, a parallel link mechanism having a pair of arm parts and a pair of link parts, a position sensor which detects the position of a base-end part of the arm part, and a controller which controls a position and/or a posture of the robot based on the position detected by the position sensor. The arm part is rotatably connected at a base-end part to the base part, and the link part is rotatably connected at a base-end part to the arm part, and is rotatably connected at a tip-end part to the movable part. The base part is coupled to the movable part through three sets of parallel link mechanisms so as to have six degrees of freedom.

Moreover, in the manipulating device according to Embodiment 1, the pair of arm parts may be connected with each other through a first connecting member having a given first holding force set beforehand.

Moreover, in the manipulating device according to Embodiment 1, when an operator operates the user interface to apply a load less than the first holding force to the first connecting member, one of the pair of arm parts operates so as to follow the operation of the other arm part, and when a load at the first holding force or more is applied to the first connecting member, the pair of arm parts operate independently.

Hereinafter, one example of the manipulating device according to Embodiment 1 is described with reference to FIGS. 1 to 5B.

[Configuration of Manipulating Device]

Figure 2:
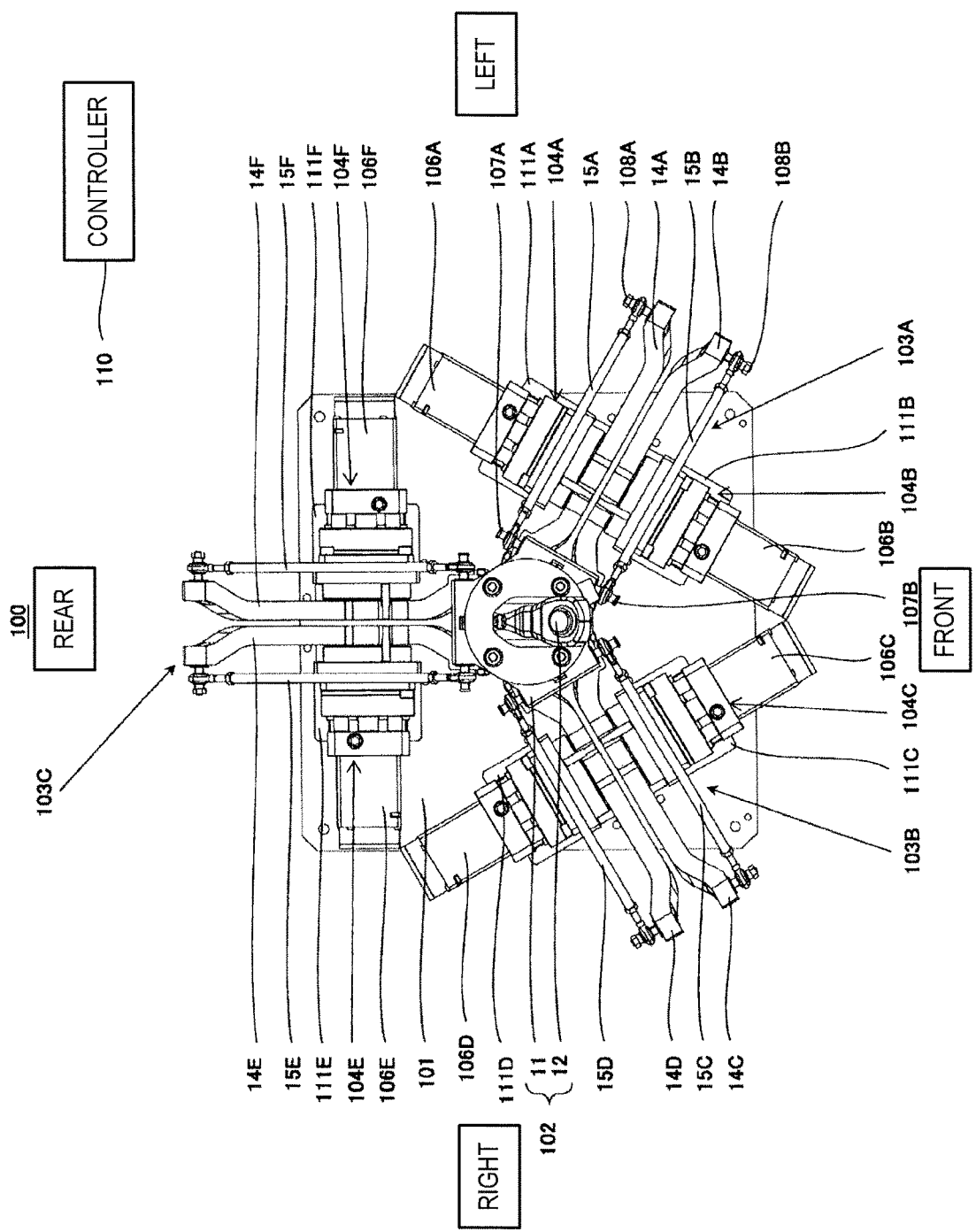
FIG. 2 is a plan view of the manipulating device illustrated in FIG. 1.

FIG. 1 is a perspective view illustrating an outline configuration of the manipulating device according to Embodiment 1. FIG. 2 is a plan view of the manipulating device illustrated in FIG. 1. Note that, in FIG. 1, an up-and-down direction, a front-and-rear direction, and a left-and-right direction of the manipulating device are expressed as an up-and-down direction, a front-and-rear direction, and a left-and-right direction in this figure, and in FIG. 2, the front-and-rear direction and the left-and-right direction of the manipulating device are expressed as a front-and-rear direction and a left-and-right direction in this figure.

As illustrated in FIGS. 1 and 2, a manipulating device 100 according to Embodiment 1 includes a base part 101, a user interface 102, parallel link mechanisms 103A-103C, position sensors 104A-104F, and a controller 110, and by an operator operating the user interface 102, a position and/or a posture of a robot 200 which will be described later are controlled.

The base part 101 is formed in a substantially rectangular shape, and the user interface 102 is disposed thereabove. The base part 101 and the user interface 102 are coupled through three sets of parallel link mechanisms 103A-103C so as to have six degrees of freedom.

The user interface 102 has a movable part 11 and a grip part 12. The movable part 11 is comprised of a plate part to which upper ends of the parallel link mechanisms 103A-103C are connected, and a cylindrical part provided so as to stand from an upper surface of the plate part. The grip part 12 of a substantially cylindrical shape is provided so as to stand from an upper surface of the cylindrical part of the movable part 11. The grip part 12 is a portion where the operator grips, and is provided with various kinds of buttons 12A and 12B for operating the robot 200. The button 12A and/or the button 12B may function, for example, as a switch (a trigger, a switch) for switching a position control and a posture control of the robot 200.

Note that, in Embodiment 1, the grip part 12 is disposed, in an initial state (at an origin), so that its axial center inclines forward. Therefore, when the operator grips the grip part 12, it can be prevented that an excessive force is applied to the operator's wrist.

The parallel link mechanisms 103A-103C are disposed at equal angular interval (120° interval) when seen from above. The parallel link mechanism 103A has a pair of arm parts 14A and 14B, and a pair of link parts 15A and 15B. Similarly, the parallel link mechanism 103B has a pair of arm parts 14C and 14D, and a pair of link parts 15C and 15D, and the parallel link mechanism 103C has a pair of arm parts 14E and 14F, and a pair of link parts 15E and 15F.

The link part 15A is rotatably connected at an upper end part (tip-end part) with the movable part 11 of the user interface 102 through a first joint 107A. Moreover, the link part 15A is rotatably connected at a lower end (base-end part) with an outward end part 3A (tip-end part) of the arm part 14A through a second joint 108A (refer to FIG. 3).

Similarly, the link part 15B is rotatably connected at an upper end part (tip-end part) with the movable part 11 of the user interface 102 through a first joint 107B. Moreover, the link part 15B is rotatably connected at a lower end (base-end part) with an outward end part 3B (tip-end part) of the arm part 14B through a second joint 108B (refer to FIG. 3).

Various kinds of joint, such as a universal joint or a ball joint, may be used as the first joints 107A and 107B and the second joints 108A and 108B.

Note that, since, the link parts 15C-15F are configured similarly to the link parts 15A and 15B, the detailed description thereof is omitted.

The arm part 14A is rotatably connected at a base-end part with the base part 101 through a substantially L-shaped supporting member 111A by a suitable device. Moreover, the arm part 14B is rotatably connected at a base-end part with the base part 101 through a substantially L-shaped supporting member 111B by a suitable device. Similarly, the arm parts 14C-14F are rotatably connected at base-end parts with the base part 101 through substantially L-shaped supporting members 111C-111F by suitable device, respectively.

Here, the pair of arm parts 14A and 14B are described in detail with reference to FIG. 3. Note that, since the arm part 14B is configured similarly to the arm part 14A, the detailed description thereof is omitted. Moreover, since the other pairs of arm parts 14C-14F are configured similarly to the arm part 14A, the detailed description thereof is omitted.

Figure 3:
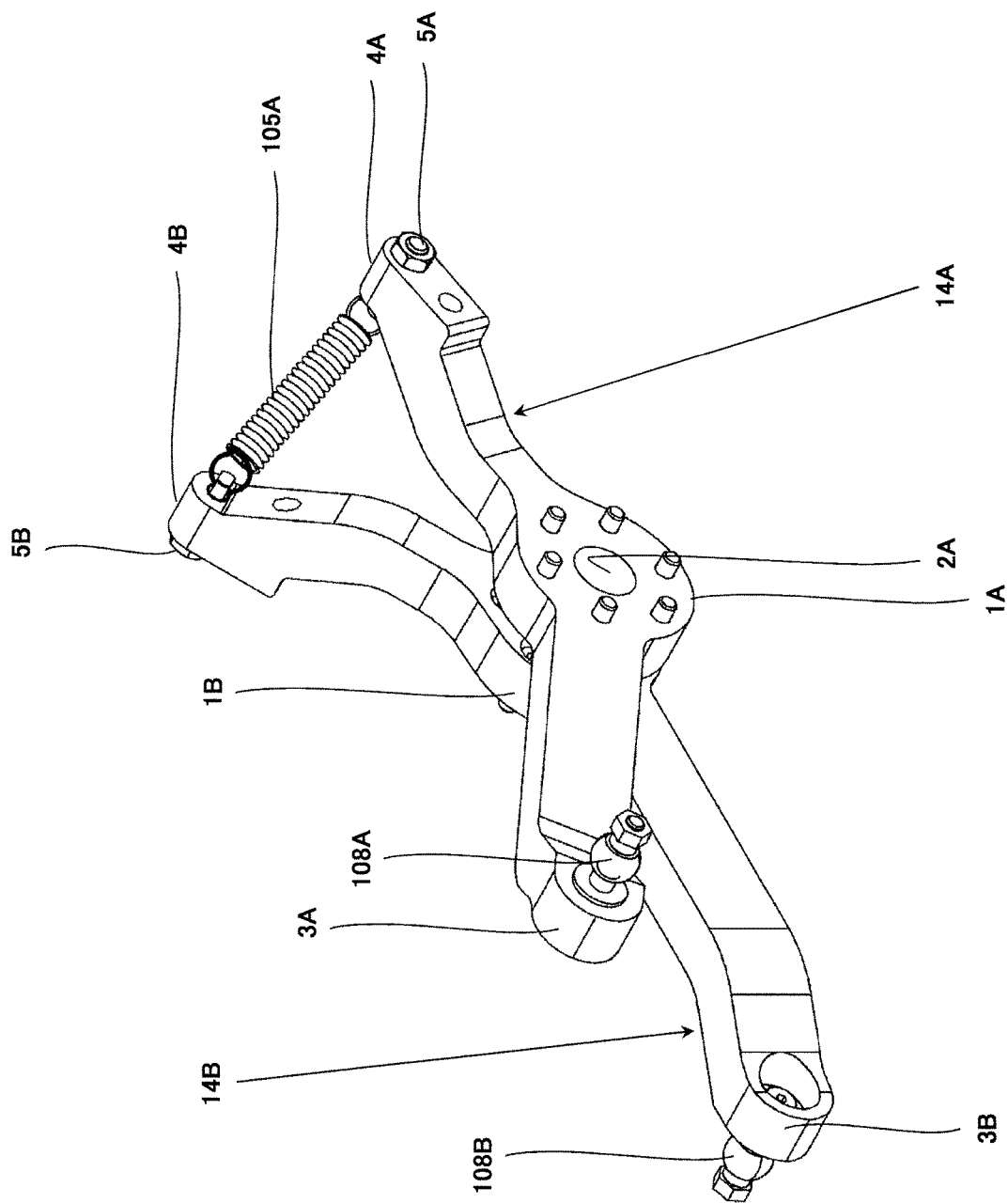
FIG. 3 is a perspective view illustrating an outline configuration of a pair of arm parts of the manipulating device illustrated in FIG. 1.

FIG. 3 is a perspective view illustrating an outline configuration of the pair of arm parts of the manipulating device illustrated in FIG. 1.

As illustrated in FIG. 3, the arm part 14A is formed in a substantially V-shape, and its bending portion 1A constitutes the base-end part of the arm part 14A. Moreover, a through-hole 2A is formed in the bending portion 1A. An output shaft of the driver (here, a servo motor) 106A is fixed directly or indirectly to the through-hole 2A by a suitable device (not illustrated).

Note that, the output shaft of the driver 106A may be supported by a bearing member (for example, a bearing) provided to the supporting member 111A. Moreover, the driver 106A may be configured to drive the user interface 102 so that the user interface 102 is not lowered from the origin by the weight of the user interface 102, etc.

Moreover, the outward end part 3A constitutes the tip-end part of the arm part 14A of the arm part 14A. As described above, the base-end part of the link part 15A is rotatably connected with the outward end part 3A through the second joint 108A (refer to FIGS. 1 and 2).

Further, one end of the first connecting member 105A is rotatably connected with the inward end part 4A of the arm part 14A through the first fastening member 5A. The other end of the first connecting member 105A is rotatably connected with the inward end part 4B of the arm part 14B through the first fastening member 5B. In more detail, when the user interface 102 is at the origin, the first connecting member 105A is configured to connect the arm part 14A with the arm part 14B so that the first connecting member 105A becomes perpendicular to the extending direction of the arm part 14A. Note that, here, the first fastening member 5A and the first fastening member 5B are comprised of a bolt and a nut.

When a load less than a given first holding force set beforehand is applied to the first connecting member 105A, one of the arm parts 14A and 14B follows the operation of the other arm part, and when a load at the first holding force or more is applied to the first connecting member 105A, the arm part 14A and the arm part 14B operate independently.

The first connecting member 105A may be, for example, comprised of a tensile spring. Moreover, the first connecting member 105A may be, for example, comprised of the drivers 106A and 106B. In this case, the arm part 14A and the arm part 14B are connected with each other electrically. Moreover, when the first connecting member 105A is comprised of the drivers 106A and 106B, a torque sensor etc. is provided to the output shafts of the drivers 106A and 106B, the controller 110 determines whether the load more than the first holding force is applied based on a torque value detected by the torque sensor, and controls the drivers 106A and 106B based on the determination.

Moreover, the first holding force may be set beforehand by an experiment etc. In detail, the first holding force may be 0.1 N·m to 1.0 N·m. Moreover, when the first connecting member 105A is comprised of a tensile spring, a spring constant etc. may suitably be set so that the tensile spring has the first holding force. Moreover, when the first connecting member 105A is comprised of the drivers 106A and 106B, the motor is selected based on, for example, the weight of the user interface 102, and the load to be applied to the joint, such as the first joint 107A.

Moreover, as illustrated in FIGS. 1 and 2, the supporting member 111A is provided with the position sensor 104A which detects the position of the base-end part of the arm part 14A (here, the bending portion 1A). Moreover, the supporting member 111B is provided with the position sensor 104B which detects the position of the base-end part of the arm part 14B (here, the bending portion 1B).

Similarly, the supporting member 111C is provided with a position sensor 104C which detects the position of the base-end part of the arm part 14C, and the supporting member 111D is provided with a position sensor 104D which detects the position of the base-end part of the arm part 14D. Moreover, the supporting member 111E is provided with a position sensor 104E which detects the position of the base-end part of the arm part 14E, and the supporting member 111F is provided with a position sensor 104F which detects the position of the base-end part of the arm part 14F.

The position sensors 104A-104F are configured to detect the positions of the base-end parts of the arm parts 14A-14F, respectively, and output the detected positional information to the controller 110. The position sensors 104A-104F may be, for example, rotation sensors which detect rotational positions of the base-end parts of the arm parts 14A-14F. The rotation sensor may be, for example, a rotary encoder, a potentiometer, or a laser sensor. Note that the position sensors 104A-104F may detect the rotational positions of the base-end parts of the arm parts 14A-14F directly or indirectly. For example, the position sensors 104A-104F may detect the rotational positions of the output shafts of the drivers 106A-106F as the rotational positions of the base-end parts of the arm parts 14A-14F, respectively.

Alternatively, for example, the position sensors 104A-104F may convert the rotational motions (rotational operation) of the arm parts 14A-14F into linear motions by using mechanisms (ball-screw mechanism etc.) which convert the rotational motions into the linear motions (linear operation), and detect the displacements by linear sensors. The linear sensor may be, for example, a linear encoder or a laser sensor.

The controller 110 includes an arithmetic part, such as a microprocessor or a CPU, and a memory, such as a ROM and/or a RAM (not illustrated). The memory stores information on a basic program, various fixed data, etc. The arithmetic part controls various operations of the robot 200 by reading and executing software, such as the basic program stored in the memory.

Note that the controller 110 may be comprised of a sole controller 110 which carries out a centralized control, or may be comprised of a plurality of controllers 110 which collaboratively carry out a distributed control. Moreover, the controller 110 may be comprised of a microcomputer, or may be comprised of a MPU, a PLC (Programmable Logic Controller), or a logic circuit.

[Configuration of Robot System]

Next, one example of a robot system provided with the manipulating device according to Embodiment 1 is described with reference to FIG. 4.

Figure 4:
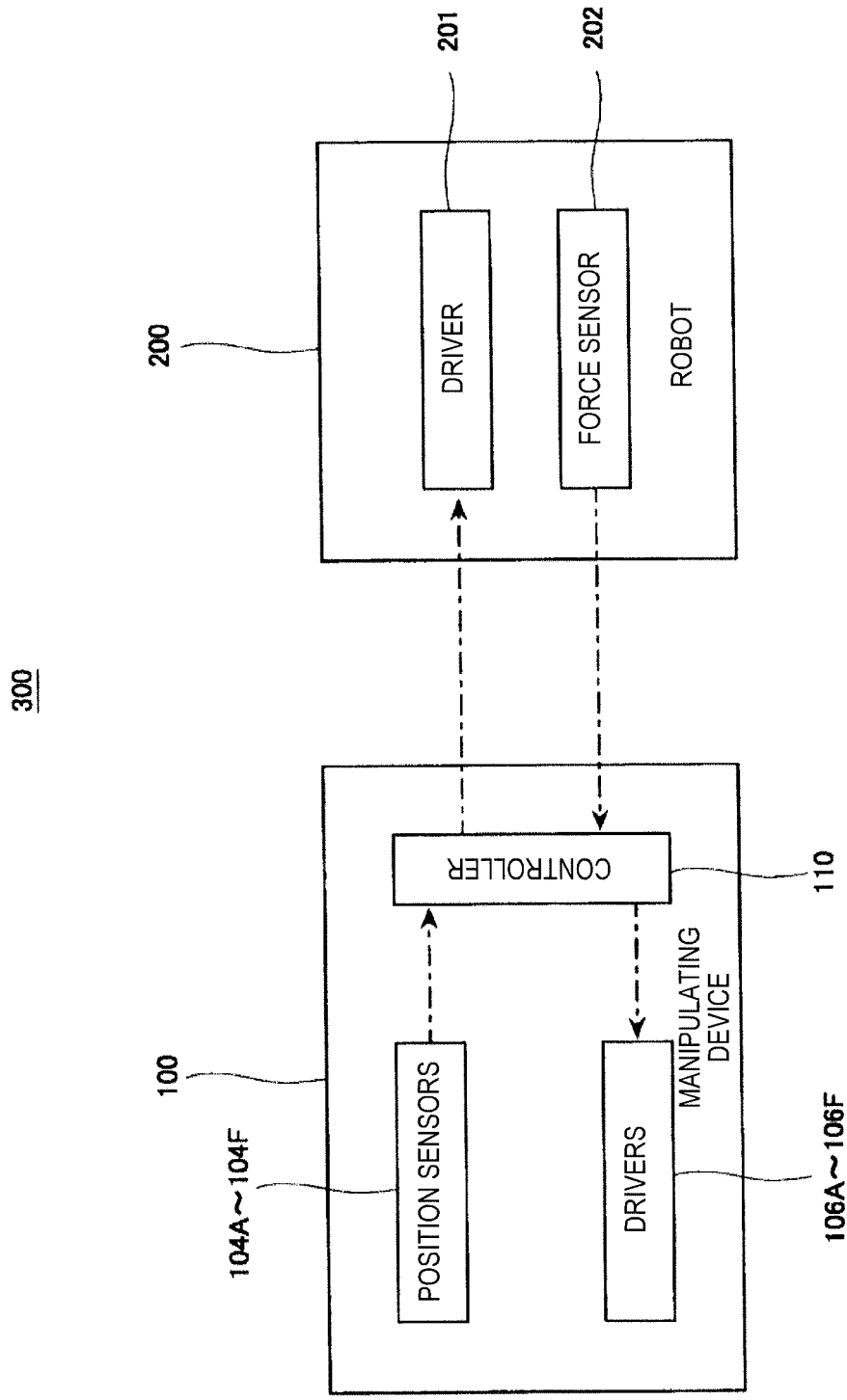
FIG. 4 is a block diagram illustrating an outline configuration of a robot system provided with the manipulating device according to Embodiment 1.

FIG. 4 is a block diagram illustrating an outline configuration of the robot system provided with the manipulating device according to Embodiment 1.

As illustrated in FIG. 4, the robot system 300 provided with the manipulating device according to Embodiment 1 includes the manipulating device 100 and the robot 200. The robot 200 may be a horizontal articulated dual-arm robot, or may be other robots of a horizontal articulated or vertical articulated type.

The robot 200 has the driver 201 which relatively drives each joint. The driver 201 is configured to drive based on the instruction values of the position and/or the posture of the robot 200 outputted from the controller 110. The driver 201 may be, for example, a servo motor.

Moreover, the robot 200 may have a force sensor 202. The force sensor 202 is configured to detect a reaction force which acts on an end effector etc. from the outside, or a force acted by the end effector to the outside, and output the detected force information to the controller 110. The controller 110 may perform a haptics control which feeds back the force information detected by the force sensors 202 to the drivers 106A-106F. Moreover, the controller 110 may bilaterally control the manipulating device 100 and the robot 200.

[Operation and Effects of Robot System Provided with Manipulating Device]

Next, operation and effects of the manipulating device according to Embodiment 1 are described with reference to FIGS. 1 to 5B.

Figure 5A:
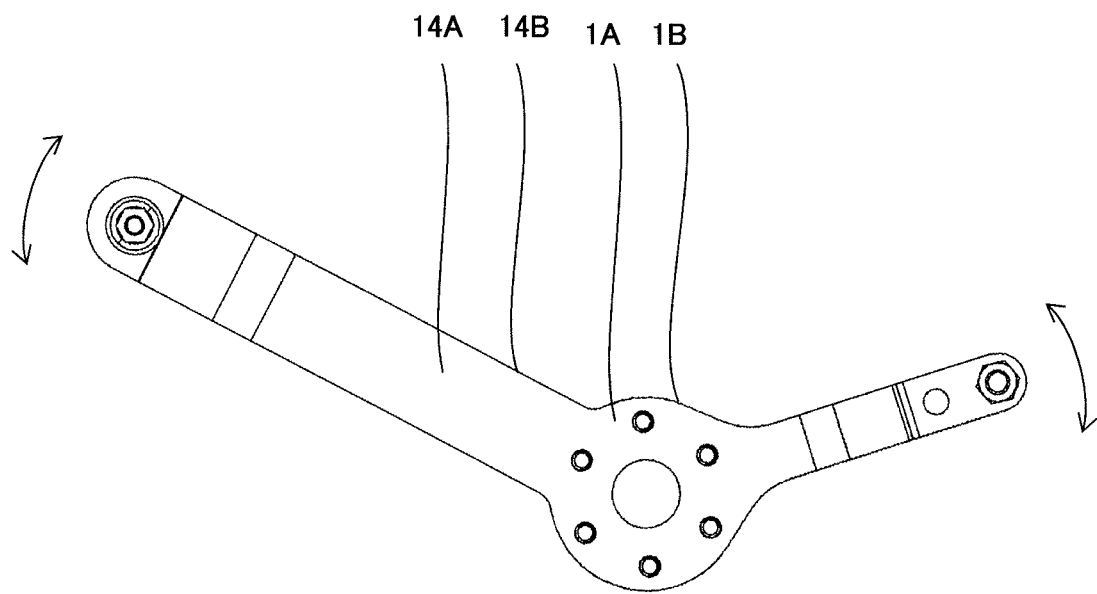
FIG. 5A is a schematic diagram illustrating an outline configuration of the pair of arm parts of the manipulating device illustrated in FIG. 1.
Figure 5B:
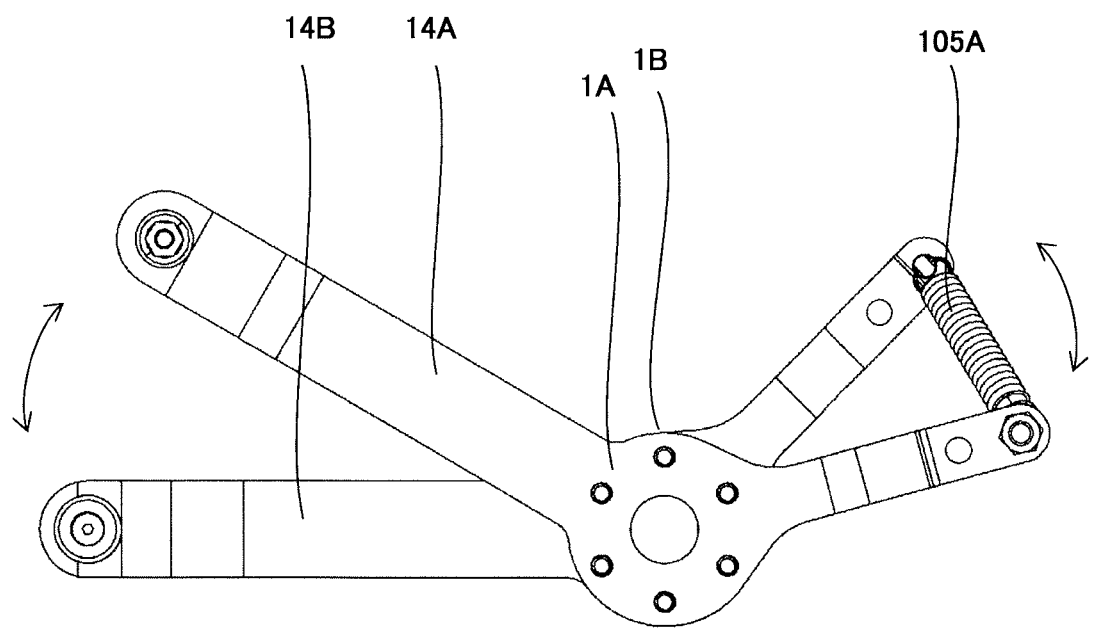
FIG. 5B is a schematic diagram illustrating the outline configuration of the pair of arm parts of the manipulating device illustrated in FIG. 1.

FIGS. 5A and 5B are schematic diagrams illustrating an outline configuration of the pair of arm parts of the manipulating device illustrated in FIG. 1, where FIG. 5A illustrates a state where the load less than the first holding force is applied to the first connecting member, and FIG. 5B illustrates a state where the load at the first holding force or more is applied to the first connecting member.

When the operator grips the grip part 12 of the user interface 102 and operates the user interface 102, the movable part 11 moves in the up-and-down, front-and-rear, and left-and-right directions. In connection with this, the link parts 15A-15F and the arm parts 14A-14F rotate (pivot).

At this time, as illustrated in FIG. 5A, if the load less than the first holding force is applied to the first connecting member 105A, one of the arm parts 14A and 14B operates (pivots) so as to follow the operation (pivoting) of the other arm part by the elastic force of the first connecting member 105A.

Similarly, if the load less than the first holding force is applied to the first connecting member 105B, one of the arm parts 14C and 14D operates so as to follow the operation (pivoting) of the other arm part by the elastic force of the first connecting member 105B. Moreover, if the load less than the first holding force is applied to the first connecting member 105C, one of the arm parts 14E and 14F operates (pivots) so as to follow the operation (pivoting) of the other arm part by the elastic force of the first connecting member 105C.

Therefore, the movable part 11 of the user interface 102 moves in the up-and-down, front-and-rear, and left-and-right directions, while maintaining the horizontal state. Therefore, a control instruction value outputted from the controller 110 becomes an instruction value for changing the positional information of the robot 200, and thereby the robot 200 can maintain the posture state just before the operator operates the user interface 102. That is, when the operator operates the user interface 102 so that the load less than the first holding force is applied to the first connecting members 105A-105C (so that the movable part 11 maintains the horizontal state), the position of the robot 200 can be changed.

On the other hand, as illustrated in FIG. 5B, if the load at the first holding force or more is applied to the first connecting member 105A, the arm parts 14A and 14B operate (pivot) independently. Similarly, if the load more than the first holding force is applied to the first connecting member 105B, the arm parts 14C and 14D operate (pivot) independently. Moreover, if the load more than the first holding force is applied to the first connecting member 105C, the arm parts 14E and 14F operate (pivot) independently.

Thus, the movable part 11 of the user interface 102 inclines in any direction and moves in the up-and-down, front-and-rear, and left-and-right directions, while being inclined. Therefore, the control instruction value outputted from the controller 110 becomes the posture information of the robot 200, or the posture information and the positional information of the robot 200, and the posture of the robot 200, or the posture and the position of the robot 200 can be changed. That is, when the operator operates the user interface 102 so that the load more than the first holding force is applied to at least one or more first connecting members among the first connecting members 105A-105C, the robot 200 can be operated so that the position of the robot 200, or the position and the posture of the robot 200 are changed.

In the manipulating device 100 according to Embodiment 1 configured in this way, each of the link parts 15A-15F which constitute the parallel link mechanisms 103A-103C is rotatably coupled to one movable part 11. Therefore, the size can be reduced, as compared with the parallel manipulator disclosed in Patent Document 1.

Moreover, in the manipulating device 100 according to Embodiment 1, when the grip part 12 is in the initial state (at the origin), the grip part 12 is disposed so that its axial center inclines forward. Therefore, when the operator grips the grip part 12, it can be prevented that an excessive force is applied to the operator's wrist. Therefore, the operator's fatigue can be reduced.

Moreover, in the manipulating device 100 according to Embodiment 1, the first connecting member is disposed at the pair of arm parts.

Therefore, when the operator operates the user interface 102 so that the load less than the first holding force is applied to the first connecting members 105A-105C, the robot 200 can be operated so that the position of the robot 200 is changed.

On the other hand, when the operator operates the user interface 102 so that the load more than the first holding force is applied to at least one or more first connecting members among the first connecting members 105A-105C, the robot 200 can be operated so that the position of the robot 200, or the position and the posture of the robot 200 are changed.

That is, when the operator changes the load applied to the first connecting member, the position control and the posture control of the robot 200 can be switched.

Note that, although in the manipulating device 100 according to Embodiment 1 the drivers 106A-106F are provided, it is not limited to this configuration. One or more of the drivers 106A-106F may not be provided.

[Modification 1]

Next, a modification of the manipulating device 100 according to Embodiment 1 is described.

A manipulating device of the modification 1 of Embodiment 1 further includes a driver which is provided to the base-end part of the arm part and drives the arm part, and when performing the position control of the robot, the controller causes the driver to drive one of the pair of arm parts so as to follow the operation of the other arm part.

Moreover, the manipulating device of Modification 1 may further include a switch which switches between the position control and the posture control of the robot.

Below, one example of the manipulating device of Modification 1 is described.

[Configuration of Manipulating Device]

Since the manipulating device 100 according to Modification 1 has a similar configuration to the manipulating device 100 of Embodiment 1, the detailed description thereof is omitted.

Note that, in Modification 1, the button 12A and/or the button 12B function as the switch for switching between the position control and the posture control of the robot 200. In detail, for example, when the operator operates (presses) the button 12A, the position control of the robot 200 is executed, and when the operator operates (presses) the button 12B, the posture control of the robot 200 (including both the posture control and the position control) is executed.

Moreover, in the manipulating device 100 of Modification 1, at least one or more first connecting members among the first connecting members 105A-105C may not be provided.

[Operation and Effects of Manipulating Device]

When the operator operates (presses) the button 12A and operates the user interface 102 in order to execute the position control of the robot 200, the controller 110 controls the driver which drives one of the pair of arm parts to follow the operation (pivoting) of the other arm part. In detail, the controller 110 acquires the positional information on the base-end part of the other arm part (for example, a rotational angle) from the position sensor, and controls the driver which drives one arm part based on the positional information.

On the other hand, when the operator operates (presses) the button 12B and operates the user interface 102 in order to execute the posture control of the robot 200, the controller 110 controls the driver so that the pair of arm parts operate (pivot) independently. At this time, the controller 110 may control the driver so that the operator does not feel the load. Moreover, the controller 110 may execute the haptics control which feeds back the force information detected by the force sensor 202 to the drivers 106A-106F. Alternatively, the controller 110 may bilaterally control the manipulating device 100 and the robot 200.

Even by the manipulating device 100 of Modification 1 configured in this way, similar operation and effects to the manipulating device 100 according to Embodiment 1 can be obtained.

Moreover, in the manipulating device 100 of Modification 1, since the position control and the posture control of the robot 200 can be switched by using the button 12A and the button 12B, the robot 200 can be operated easily.

Note that, in Modification 1, although the switching between the position control and the posture control of the robot 200 is performed by using the button 12A and the button 12B is adopted, it is not limited to this configuration. The switching between the position control and the posture control of the robot 200 may be performed by using the button 12A, or may be performed by using the button 12B. In this case, the position control and the posture control of the robot 200 may be switched by pressing the button once and pressing twice.

[Modification 2]

[Configuration of Manipulating Device]

Figure 6:
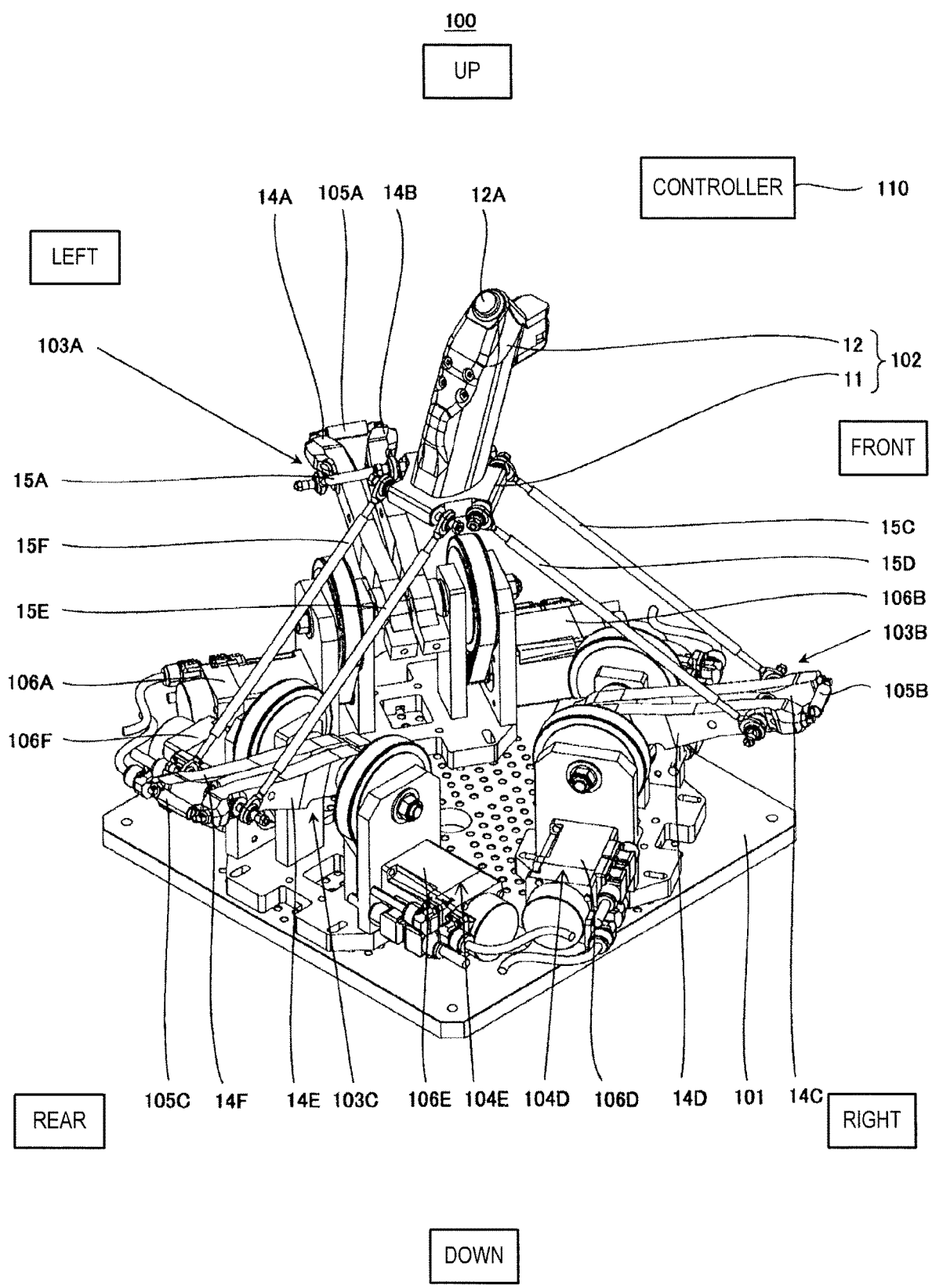
FIG. 6 is a perspective view illustrating an outline configuration of a manipulating device of Modification 2 in Embodiment 1.
Figure 7:
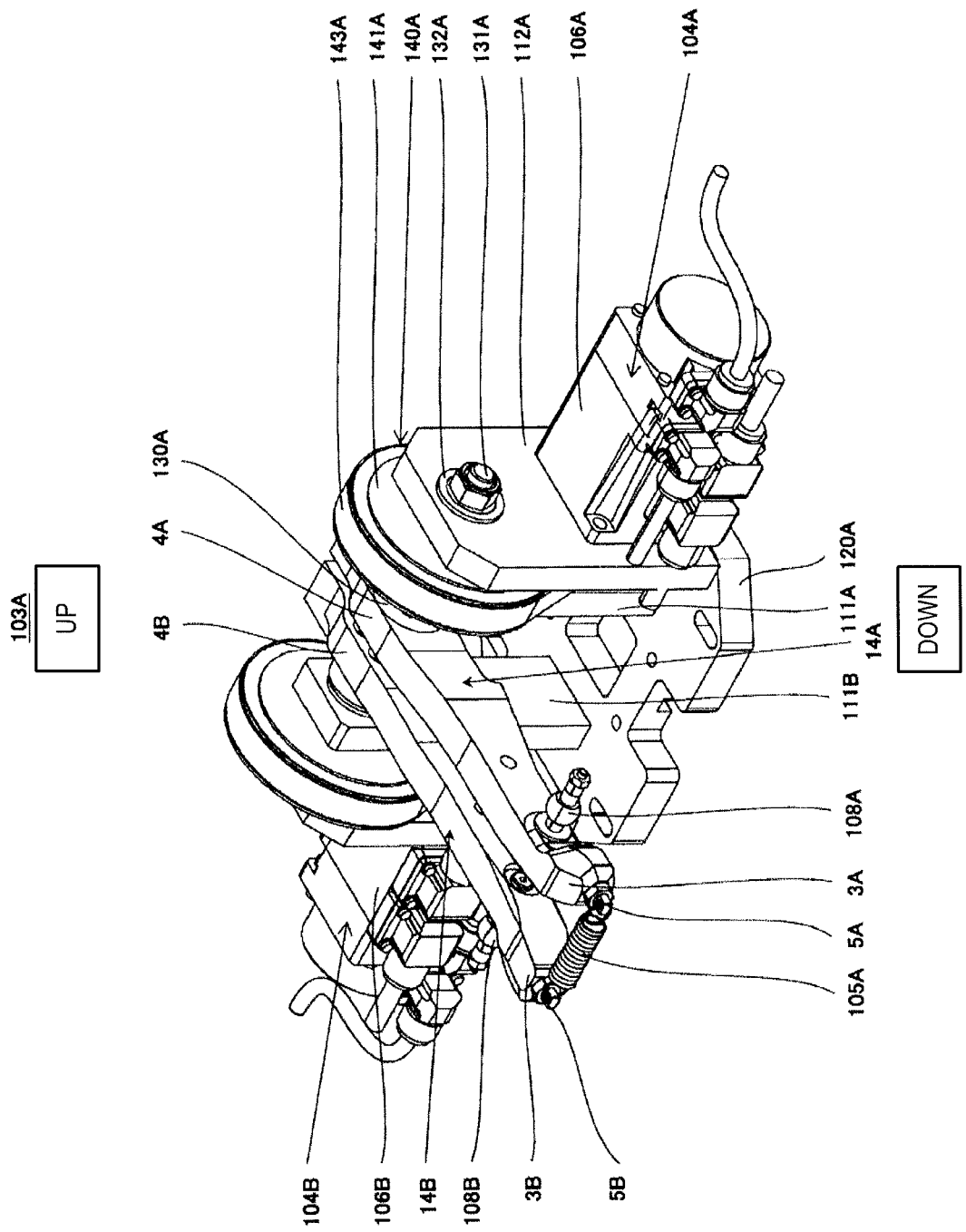
FIG. 7 is a perspective view illustrating an outline configuration of a substantial part of a parallel link mechanism in the manipulating device illustrated in FIG. 6.

FIG. 6 is a perspective view illustrating an outline configuration of a manipulating device of Modification 2 in Embodiment 1. FIG. 7 is a perspective view illustrating an outline configuration of a substantial part of a parallel link mechanism in the manipulating device illustrated in FIG. 6.

Note that, in FIG. 6, the up-and-down direction, the front-and-rear direction, and the left-and-right direction of the manipulating device are expressed as an up-and-down direction, a front-and-rear direction, and a left-and-right direction in this figure, and in FIG. 7, the up-and-down direction of the manipulating device is expressed as an up-and-down direction in this figure.

As illustrated in FIG. 6, although the manipulating device 100 of Modification 2 in Embodiment 1 is the same in the fundamental configuration as the manipulating device 100 according to Embodiment 1, it differs in that the rotation shaft of the base-end part of the arm part which constitutes the parallel link mechanism and the output shaft of the driver are coupled through a belt drive, and the first connecting member is provided to the tip-end part of the arm part.

Below, a configuration of the parallel link mechanism 103A is described with reference to FIG. 7. Note that, since the parallel link mechanisms 103B and 103C are configured similarly to the parallel link mechanism 103A, the detailed description thereof is omitted. Moreover, since the arm part 14B is configured similarly to the arm part 14A, the detailed description thereof is omitted.

As illustrated in FIG. 7, the arm part 14A is formed in a bar shape, and one end of the first connecting member 105A is connected with the outward end part 3A (tip-end part) through the first fastening member 5A. The other end of the first connecting member 105A is rotatably connected with the outward end part (tip-end part) 3B of the arm part 14B through the first fastening member 5B. In more detail, when the user interface 102 is at the origin, the first connecting member 105A is configured to connect the arm part 14A and the arm part 14B so as to become perpendicular to the extending direction of the arm part 14A.

The inward end part (base-end part) 4A of the arm part 14A is rotatably connected with an upper end part of the plate-shaped supporting member 111A through the bearing member 130A. In detail, a through-hole is formed in the inward end part 4A, and a base-end part of the bolt 131A, onto which the bearing member 130A is fitted, is fitted into the through-hole.

Moreover, a first pulley 141A is fitted onto an intermediate location of the bolt 131A, and a tip-end part the bolt 131A is rotatably provided to an upper end part of the supporting member 112A through the bearing member 132A. That is, the bolt 131A constitutes a rotation shaft of the base-end part of the arm part 14A, and in connection with the rotation of the arm part 14A, the arm part 14A is connected with the first pulley 141A so that the first pulley 141A rotates.

Note that the supporting member 111A and the supporting member 112A are provided so as to stand from an upper surface of a base plate 120A disposed on an upper surface of the base part 101.

The first pulley 141A is disposed so as to be sandwiched between the supporting member 111A and the supporting member 112A. Moreover, below the first pulley 141A, a second pulley (not illustrated) with a smaller radius than that of the first pulley 141A is disposed. The second pulley is connected with the output shaft of the driver 106A through a suitable device (for example, a bearing etc.). Moreover, a belt 143A is wound around outer circumferential surfaces of the first pulley 141A and the second pulley.

Therefore, the rotational operation of the arm part 14A is transmitted to the output shaft of the driver 106A by a belt drive 140A comprised of the first pulley 141A, the belt 143A, and the second pulley.

Even by the manipulating device 100 of this modification 2 configured in this way, similar operation and effects to the manipulating device 100 according to Embodiment 1 can be obtained.

[Modification 3]

[Configuration of Manipulating Device]

Figure 8:
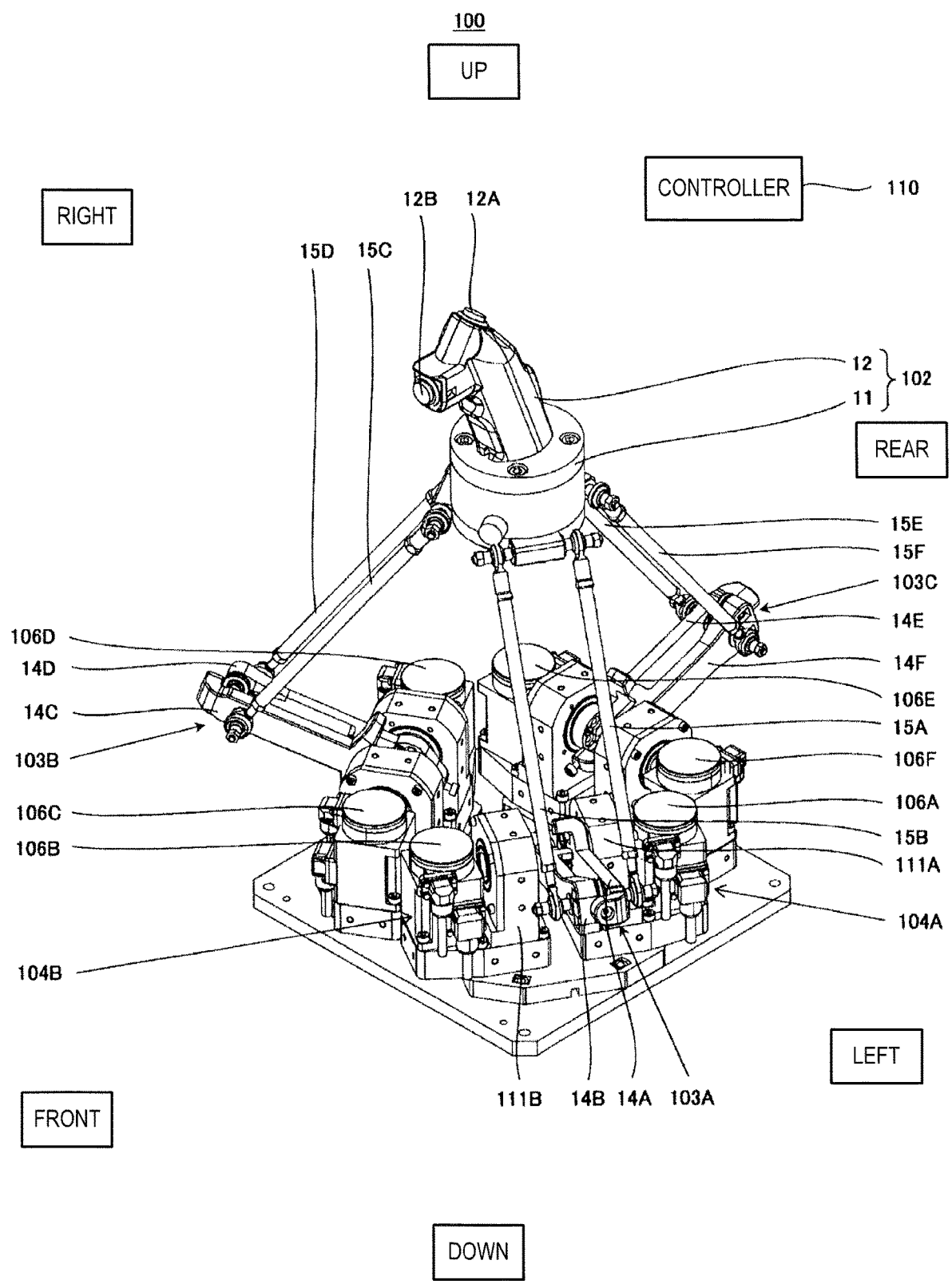
FIG. 8 is a perspective view illustrating an outline configuration of a manipulating device of Modification 3 in Embodiment 1.
Figure 9:
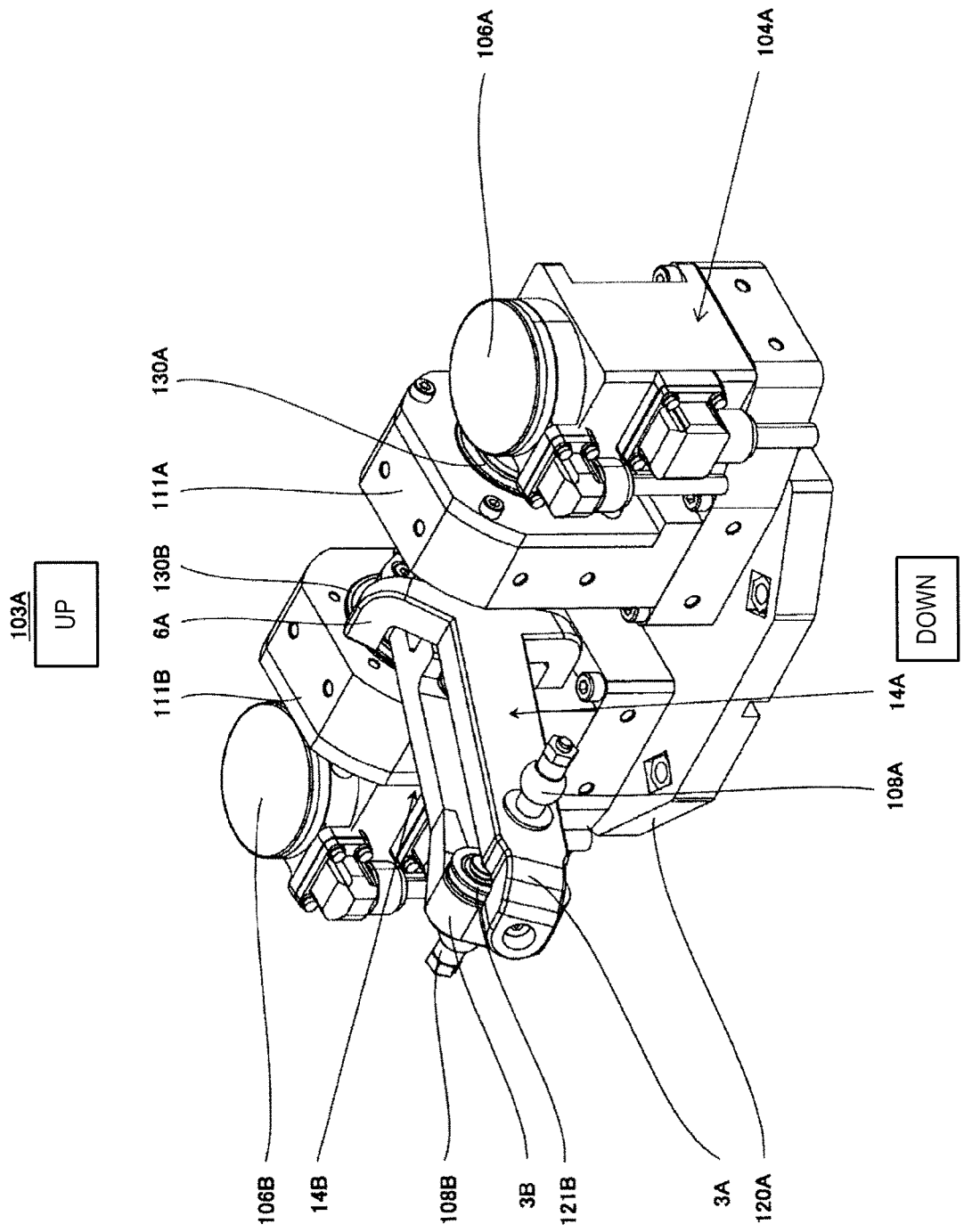
FIG. 9 is a perspective view illustrating an outline configuration of a substantial part of a parallel link mechanism in the manipulating device illustrated in FIG. 8.
Figure 10:
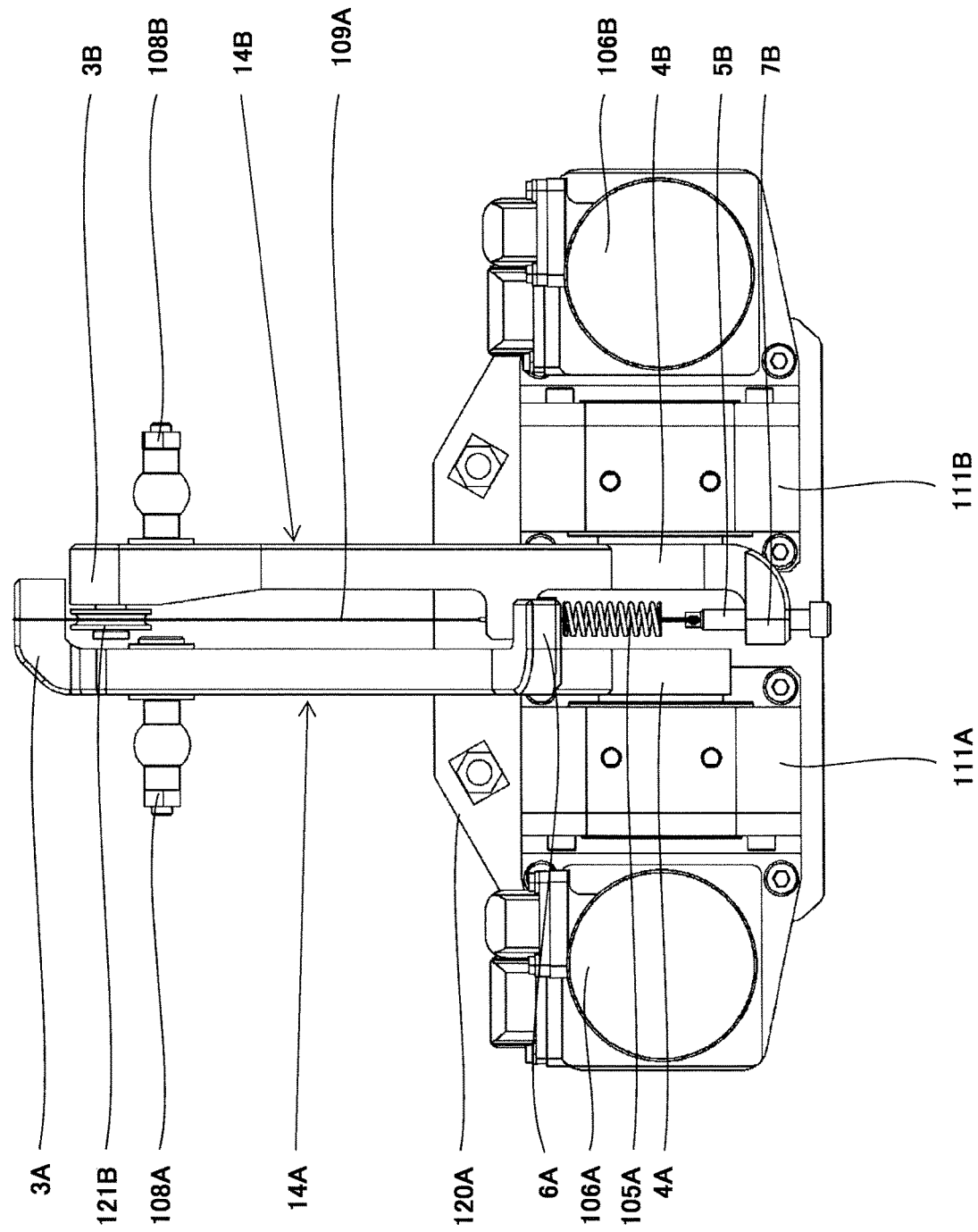
FIG. 10 is a plan view illustrating the outline configuration of the substantial part of the parallel link mechanism in the manipulating device illustrated in FIG. 8.
Figure 11:
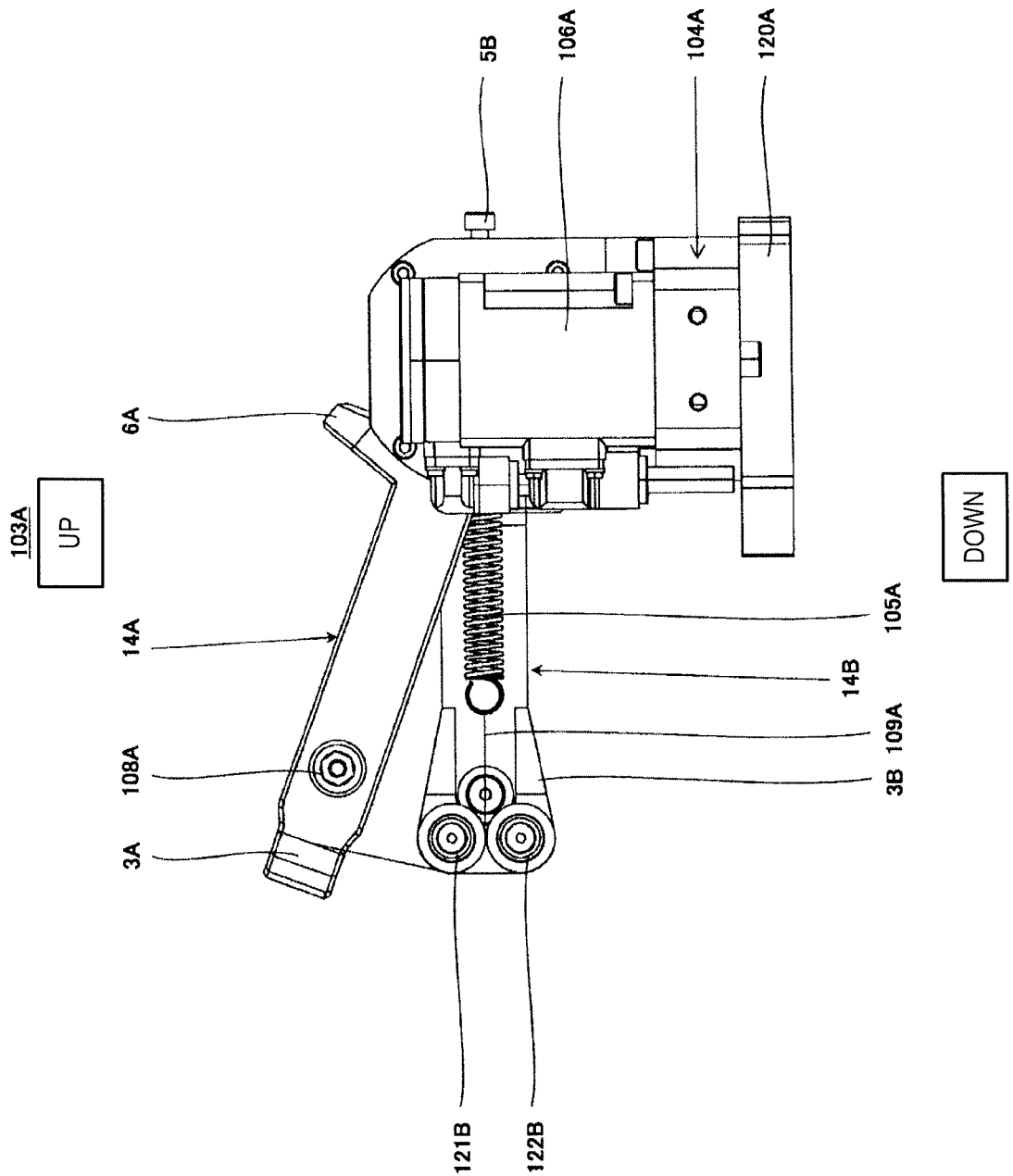
FIG. 11 is a side view illustrating the outline configuration of the substantial part of the parallel link mechanism in the manipulating device illustrated in FIG. 8.
Figure 12:
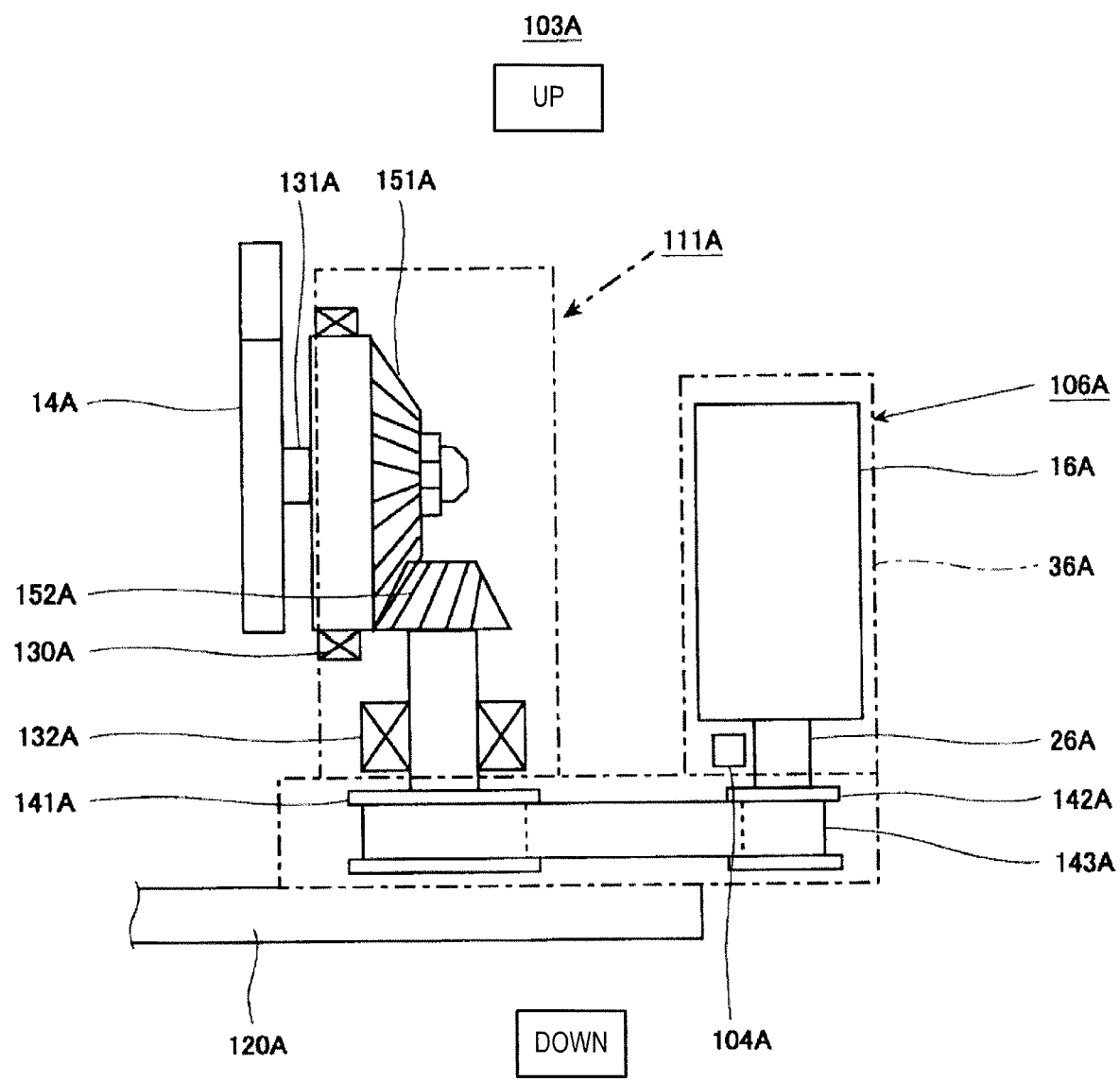
FIG. 12 is a schematic diagram illustrating an outline configuration of the substantial part of the parallel link mechanism in the manipulating device illustrated in FIG. 8.

FIG. 8 is a perspective view illustrating an outline configuration of a manipulating device of Modification 3 in Embodiment 1. FIG. 9 is a perspective view illustrating an outline configuration of a substantial part of a parallel link mechanism in the manipulating device illustrated in FIG. 8. FIG. 10 is a plan view illustrating an outline configuration of the substantial part of the parallel link mechanism in the manipulating device illustrated in FIG. 8. FIG. 11 is a side view illustrating an outline configuration of the substantial part of the parallel link mechanism in the manipulating device illustrated in FIG. 8. FIG. 12 is a schematic diagram illustrating an outline configuration of the substantial part of the parallel link mechanism in the manipulating device illustrated in FIG. 8.

Note that, in FIG. 8, the up-and-down direction, the front-and-rear direction, and the left-and-right direction of the manipulating device are expressed as an up-and-down direction, a front-and-rear direction, and a left-and-right direction in this figure, and in FIGS. 9, 11, and 12, the up-and-down direction of the manipulating device is expressed as an up-and-down direction in these figures.

As illustrated in FIGS. 8 to 12, although a manipulating device 100 of Modification 3 in Embodiment 1 is the same in the fundamental configuration as the manipulating device 100 according to Embodiment 1, it differs in that the rotation shaft of the base-end part of the arm part which constitutes the parallel link mechanism is connected with the output shaft of the driver through the hypoid gear and the belt drive, and the first connecting member is disposed in the extending direction of the arm part.

Below, a configuration of the parallel link mechanism 103A is described with reference to FIGS. 9 to 12. Note that, since the parallel link mechanisms 103B and 103C are configured similarly to the parallel link mechanism 103A, the detailed description thereof is omitted.

As illustrated in FIGS. 9 to 12, the arm part 14A is formed in a bar shape, and the inward end part (base-end part) 4A is rotatably connected with the upper end part of the substantially L-shaped supporting member 111A through the bearing member 130A. Similarly, the arm part 14B is formed in a bar shape, and the inward end part (base-end part) 4B is rotatably connected with the upper end part of the substantially L-shaped supporting member 111B through the bearing member 130B.

Here, a connecting state of the inward end part 4A of the arm part 14A and the output shaft 26A of the driver 106A is described in detail with reference to FIG. 12.

A through-hole is formed in the inward end part 4A of the arm part 14A, and a base-end part of the bolt 131A, onto which the bearing member 130A is fitted, is fitted into the through-hole. Moreover, a hypoid gear 151A is fitted onto a tip-end part of the bolt 131A. The hypoid gear 151A is formed in a substantially disk shape, and gear teeth are arranged in an annular shape. The bearing member 130A is disposed on an outer circumferential surface of the hypoid gear 151A, and rotatably supports the hypoid gear 151A.

Moreover, a hypoid pinion 152A is meshed with the hypoid gear 151A. The hypoid pinion 152A is rotatably supported at its axial part by a bearing member 132A, and fitted at its base-end part into the first pulley 141A. A second pulley 142A is disposed outward of the first pulley 141A.

The output shaft 26A of the driver 106A is connected with the second pulley 142A through a suitable device (for example, a bearing etc.). Moreover, the belt 143A is wound around the outer circumferential surface of the first pulley 141A and the second pulley. Therefore, the rotational operation of the arm part 14A is transmitted to the output shaft 26A of the driver 106A.

The driver 106A has a casing 36A, a driver body 16A, and an output shaft 26A, and the driver body 16A and the output shaft 26A are disposed inside the casing 36A. The driver body 16A may be, for example, a rotor and a stator of a servo motor.

Moreover, the position sensor 104A is disposed inside the casing 36A, and the position sensor 104A detects a rotational position of the output shaft 26A of the driver 106A and outputs the detected rotational position information to the controller 110.

Note that, since the connecting state of the inward end part 4B of the arm part 14B with the output shaft of the driver 106B is configured similarly to that of the inward end part 4A of the arm part 14A with the output shaft 26A of the driver 106A, the detailed description thereof is omitted.

Moreover, as illustrated in FIGS. 10 and 11, a stop 6A is provided to an upper part of the inward end part 4A of the arm part 14A. The stop 6A is configured to regulate a pivot range of the arm part 14B when the arm part 14A and the arm part 14B pivot independently.

Moreover, one end of the first connecting member 105A is connected with the base end 7B of the arm part 14B through the first fastening member 5B. The other end of the first connecting member 105A is connected to a wire 109A. The wire 109A is disposed so as to pass through between a pair of pulleys 121B and 122B provided to the outward end part (tip-end part) 3B of the arm part 14B. Moreover, the tip-end part of the wire 109A is fixed to the outward end part 3A of the arm part 14A. That is, in Modification 3, the first connecting member 105A is disposed along the extending direction of the arm part 14A.

Therefore, when the load less than the first holding force is applied to the first connecting member 105A, one of the arm part 14A and the arm part 14B operates (pivots) so as to follow the operation (pivoting) of the other arm part. Moreover, when the load more than the first holding force is applied to the first connecting member 105A, the arm part 14A and the arm part 14B operate (pivot) independently from each other.

Even by the manipulating device 100 of Modification 3 configured in this way, similar operation and effects to the manipulating device 100 according to Embodiment 1 can be obtained.

Moreover, in the manipulating device 100 of Modification 3, the first connecting member 105A is disposed along the extending direction of the arm part 14A. Therefore, compared with the manipulating device 100 according to Embodiment 1 in which the first connecting member 105A is disposed so as to bridge between the arm part 14A and the arm part 14B, a distance between the arm part 14A and the arm part 14B can be reduced, thereby reducing the size of the manipulating device 100.

Further, in the manipulating device 100 of Modification 3, when the arm part 14A and the arm part 14B operate (pivot) independently, their displacement (angular difference) is converted into a linear amount of change through the pulleys 121B and 122B. In addition, in the manipulating device 100 of Modification 3, the first connecting member 105A is disposed so that the extending and contracting direction of the first connecting member 105A become in agreement with the linear direction converted by the pulleys 121B and 122B (a direction of the stress applied to the first connecting member 105A).

Therefore, when operating the arm part 14A and the arm part 14B independently, the arm part 14A and the arm part 14B can be operated more sensitively to the load applied to the first connecting member 105A.

Embodiment 2

In the manipulating device according to Embodiment 1 (including modifications), a manipulating device according to Embodiment 2 is provided, in the movable part, with a reversal preventing member configured to prevent a reversal of the link part.

Moreover, in the manipulating device according to Embodiment 2, one of the pair of arm parts may be provided with a roller part, and the other arm part may be provided with a roller guide part on which the roller part moves.

Below, one example of the manipulating device according to Embodiment 2 is described with reference to FIGS. 13 to 19.

[Configuration of Manipulating Device]

Figure 13:
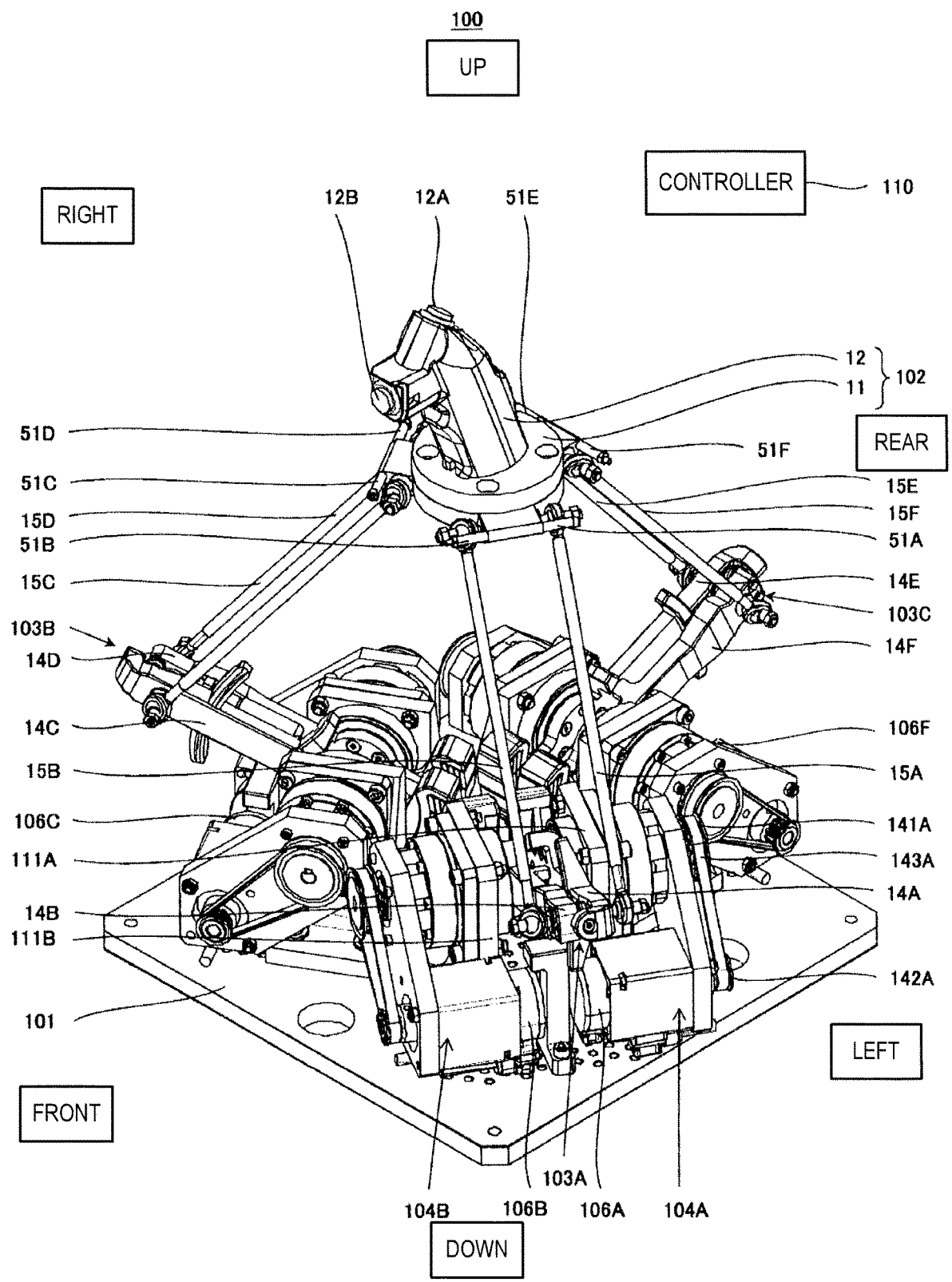
FIG. 13 is a perspective view illustrating an outline configuration of a manipulating device according to Embodiment 2.
Figure 14:
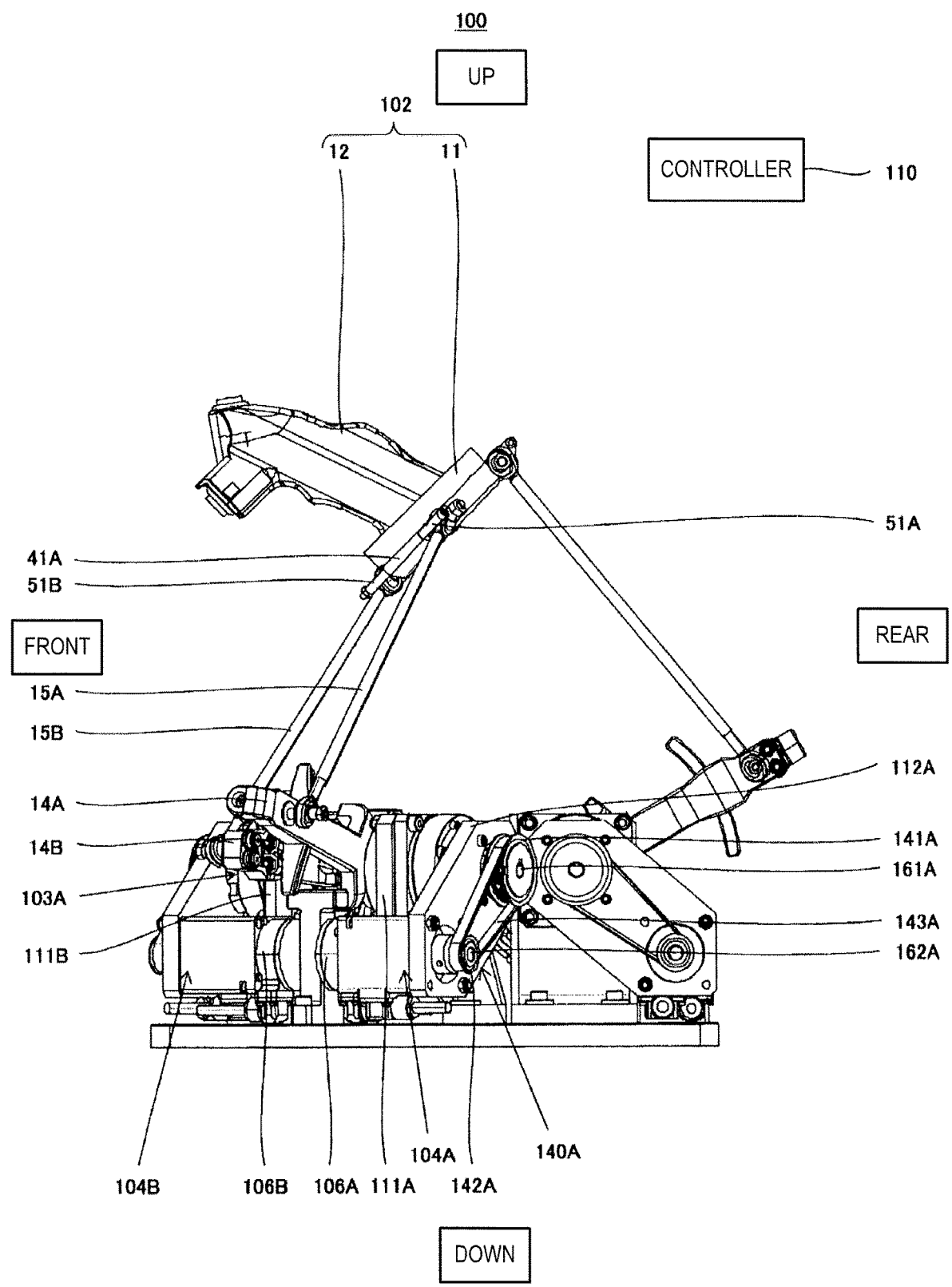
FIG. 14 is a side view of the manipulating device illustrated in FIG. 13.
Figure 15:
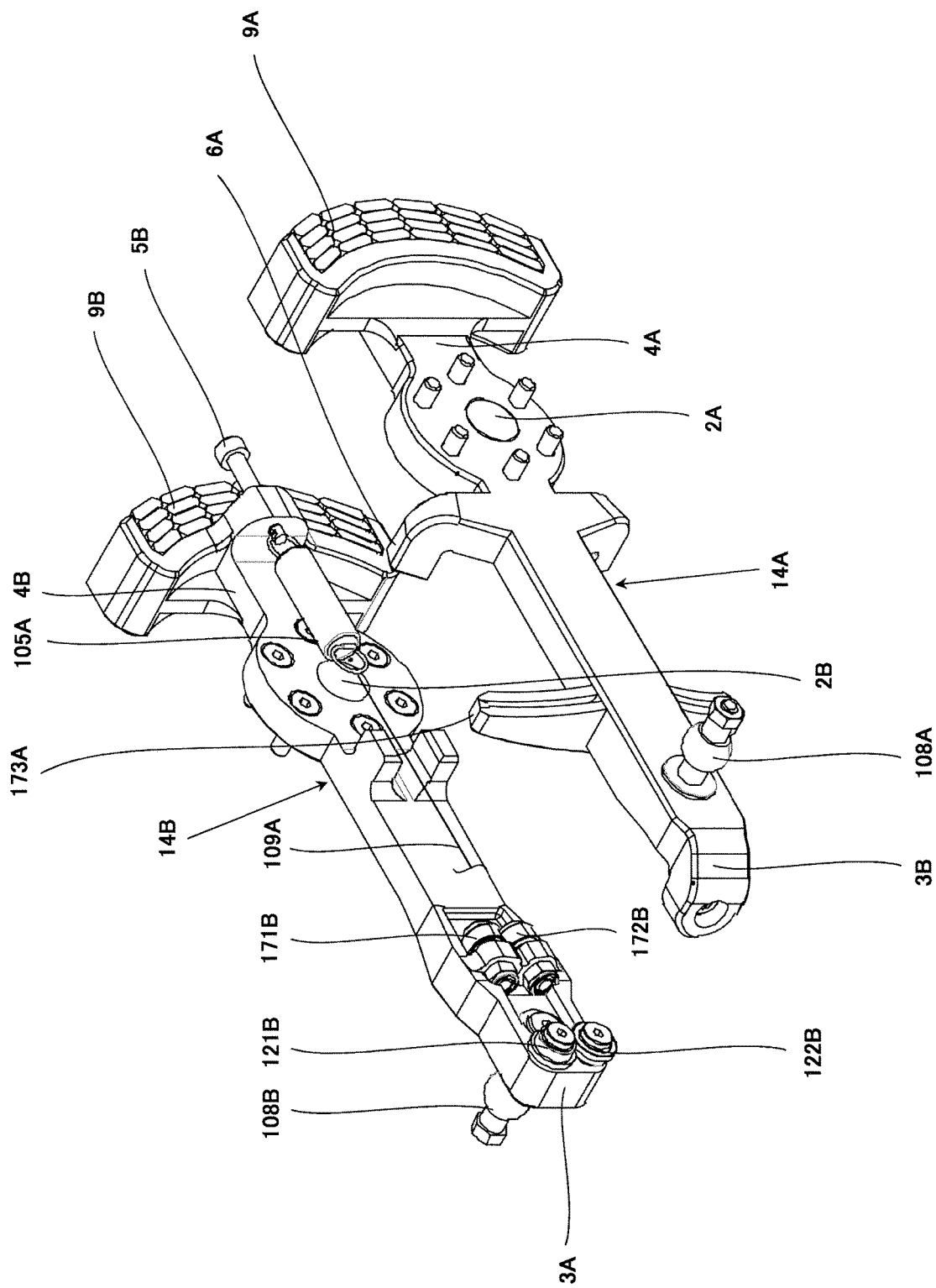
FIG. 15 is a perspective view illustrating an outline configuration of a substantial part of a parallel link mechanism in the manipulating device illustrated in FIG. 13.
Figure 16:
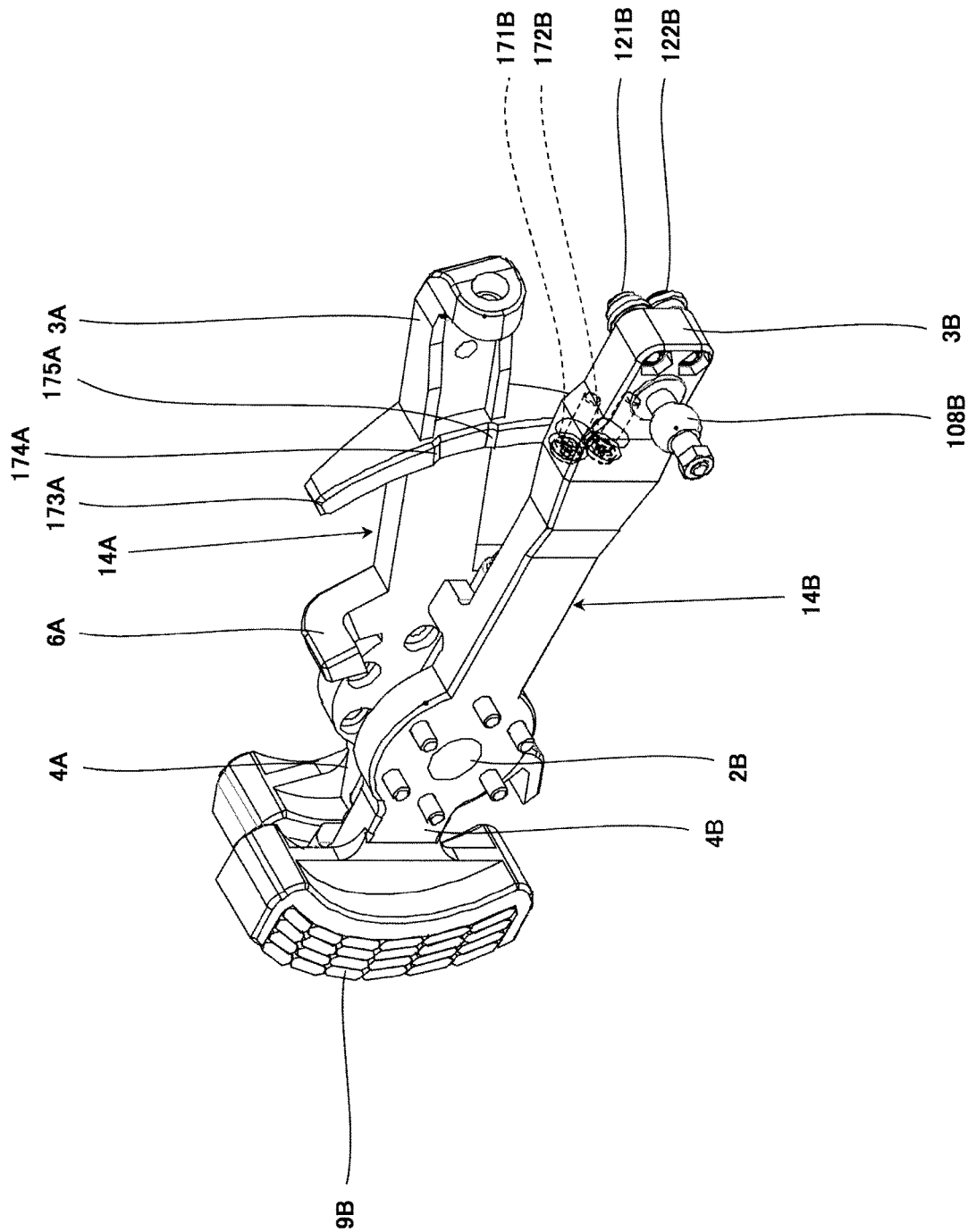
FIG. 16 is a perspective view illustrating an outline configuration of the substantial part of the parallel link mechanism in the manipulating device illustrated in FIG. 13.
Figure 17:
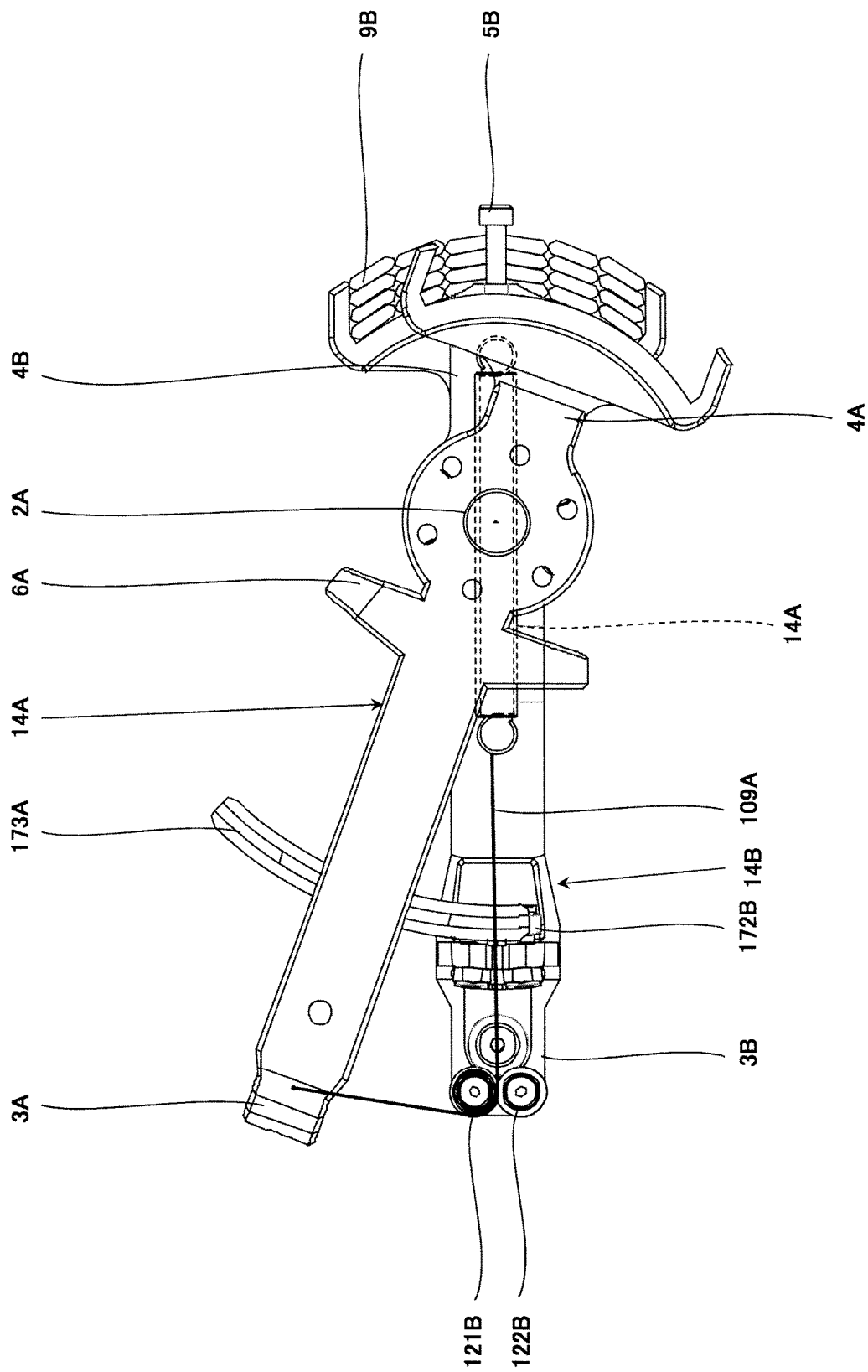
FIG. 17 is a side view illustrating an outline configuration of the substantial part of the parallel link mechanism in the manipulating device illustrated in FIG. 13.

FIG. 13 is a perspective view illustrating an outline configuration of the manipulating device according to Embodiment 2. FIG. 14 is a side view of the manipulating device illustrated in FIG. 13. Moreover, FIG. 15 is a perspective view illustrating an outline configuration of a substantial part of the parallel link mechanism in the manipulating device illustrated in FIG. 13. FIG. 16 is a perspective view illustrating an outline configuration of the substantial part of the parallel link mechanism in the manipulating device illustrated in FIG. 13. FIG. 17 is a side view illustrating an outline configuration of the substantial part of the parallel link mechanism in the manipulating device illustrated in FIG. 13.

Note that, in FIG. 13, the up-and-down direction, the front-and-rear direction, and the left-and-right direction of the manipulating device are expressed as an up-and-down direction, a front-and-rear direction, and a left-and-right direction in this figure, and in FIG. 14, the up-and-down direction and the front-and-rear direction of the manipulating device are expressed as an up-and-down direction and a front-and-rear direction in this figure. Moreover, in FIG. 17, illustration of a part of the arm part closer to the viewer is omitted.

As illustrated in FIGS. 13 and 14, although the manipulating device 100 according to Embodiment 2 is the same in the fundamental configuration as the manipulating device 100 according to Embodiment 1, it differs in that the reversal preventing member is provided to the movable part 11, and the rotation shaft of the base-end part of the arm part which constitutes the parallel link mechanism is connected with the output shaft of the driver through the belt drive.

Moreover, as illustrated in FIGS. 15 to 17, in the manipulating device 100 according to Embodiment 2, the first connecting member is disposed in the extending direction of the arm part, one of the pair of arm parts is provided with a roller part, and the other arm part is provided with a roller guide part on which a roller part moves.

Below, a configuration of the parallel link mechanism 103A is described with reference to FIGS. 13 to 17. Note that, since the parallel link mechanisms 103B and 103C are configured similarly to the parallel link mechanism 103A, the detailed description thereof is omitted.

As illustrated in FIGS. 13 and 14, similar to Modification 2 of Embodiment 1, the rotation shaft of the inward end part (base-end part) 4A of the arm part 14A is connected with the output shaft of the driver 106A through the belt drive 140A. Note that, although in Modification 2 of Embodiment 1 the arm part 14A and the belt drive 140A are disposed so as to be sandwiched between the supporting member 111A and the supporting member 112A, Embodiment 2 differs from Modification 2 of Embodiment 1 in that the arm part 14A and the belt drive 140A are disposed so as to sandwich the supporting member 111A and the supporting member 112A.

The arm part 14A is connected with the first pulley 141A through a first shaft member 161A. In detail, one end of the first shaft member 161A is fitted into the through-hole 2A (refer to FIGS. 15 to 17) formed in the inward end part 4A of the arm part 14A through a suitable device, and the other end of the first shaft member 161A is fitted into the first pulley 141A through a suitable device. Moreover, the first shaft member 161A is disposed so that a bearing member provided to an upper end of each of the supporting member 111A and the supporting member 112A is fitted therein.

Thus, the first pulley 141A can be rotated in connection with the rotation of the arm part 14A. That is, the first shaft member 161A constitutes the rotation shaft of the arm part 14A.

Moreover, below the first pulley 141A, the second pulley 142A with a smaller radius than the first pulley 141A is disposed. The output shaft of the driver 106A is connected with the second pulley 142A through the second shaft member 162A. Moreover, the belt 143A is wound around the outer circumferential surface of the first pulley 141A and the second pulley 142A.

Therefore, the rotational operation of the arm part 14A is transmitted to the output shaft of the driver 106A by the belt drive 140A comprised of the first pulley 141A, the belt 143A, and the second pulley.

Next, a configuration of the pair of arm parts 14A and 14B which constitute the parallel link mechanism 103A is described with reference to FIGS. 15 to 17. Note that, since the pair of arm parts 14C and 14D which constitute the parallel link mechanism 103B and the pair of arm parts 14E and 14F which constitute the parallel link mechanism 103C are configured similarly to the pair of arm parts 14A and 14B, the detailed description thereof is omitted.

As illustrated in FIGS. 15 to 17, the arm part 14A is formed in a substantially T-shape, and a counter weight 9A for maintaining a weight balance with the outward end part 3A (tip-end part) is provided to the inward end part (base-end part) 4A. The through-hole 2A is formed at a suitable location of the inward end part 4A at a tip-end side of the counter weight 9A. As described above, one end of the first shaft member 161A (not illustrated in FIGS. 15 to 17) is fitted into the through-hole 2A.

Similarly, the arm part 14B is formed in a substantially T-shape, and a counter weight 9B for maintaining a weight balance with the outward end part (tip-end part) 3B is provided to the inward end part (base-end part) 4B. The through-hole 2B is formed at a suitable location of the inward end part 4B at a tip-end side of the counter weight 9B. One end of the first shaft member (not illustrated) is fitted into the through-hole 2B.

Moreover, as illustrated in FIGS. 15 to 17, a stop 6A is provided to an upper part of the arm part 14A at a tip-end side of the through-hole 2A. The stop 6A is configured to regulate a pivot range of the arm part 14B when the arm part 14A and the arm part 14B pivot independently.

On the other hand, one end of the first connecting member 105A is connected with the inward end part 4B of the arm part 14B through the first fastening member 5B. The wire 109A is connected to the other end of the first connecting member 105A. The wire 109A is disposed so as to pass through between the pair of pulleys 121B and 122B provided to the outward end part (tip-end part) 3B of the arm part 14B. Moreover, a tip-end part of the wire 109A is fixed to the outward end part 3A of the arm part 14A. That is, in Embodiment 2, the first connecting member 105A is disposed along the extending direction of the arm part 14A.

Moreover, the roller parts 171B and 172B are disposed at a suitable location of the inward end part 4B of the arm part 14B at a base-end side of the pulley 121B. In more detail, the roller parts 171B and 172B are disposed in a side surface of the arm part 14B opposing to the arm part 14A. On the other hand, a roller guide part 173A is provided to the part of the arm part 14A opposing to the roller parts 171B and 172B so as to extend in the up-and-down direction. Note that stepped parts 174A and 175A may be provided to the roller guide part 173A.

Next, a configuration of the reversal preventing member is described with reference to FIGS. 18 and 19.

Figure 18:
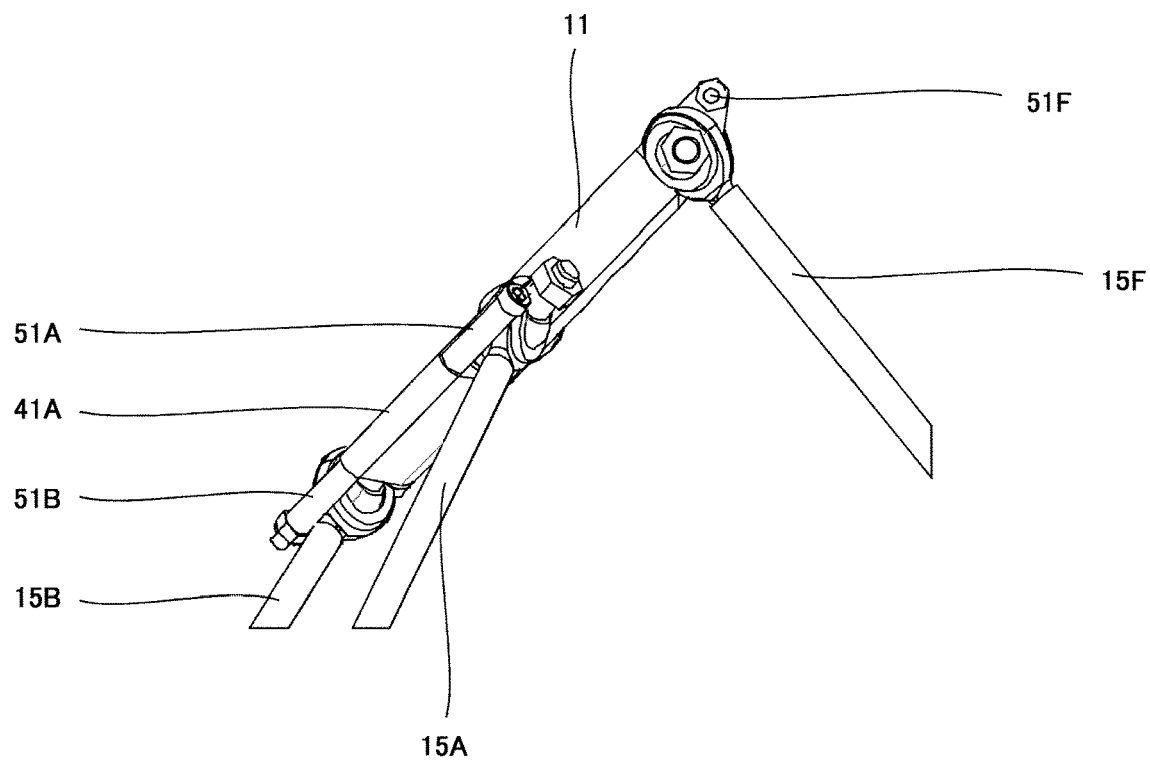
FIG. 18 is a side view illustrating an outline configuration near a movable part in the manipulating device illustrated in FIG. 13.

FIG. 18 is a side view illustrating an outline configuration near the movable part in the manipulating device illustrated in FIG. 13. FIG. 19 is a perspective view illustrating an outline configuration near the movable part in the manipulating device illustrated in FIG. 13. Note that, in FIGS. 18 and 19, illustration of the grip part etc. of the user interface is omitted.

Figure 19:
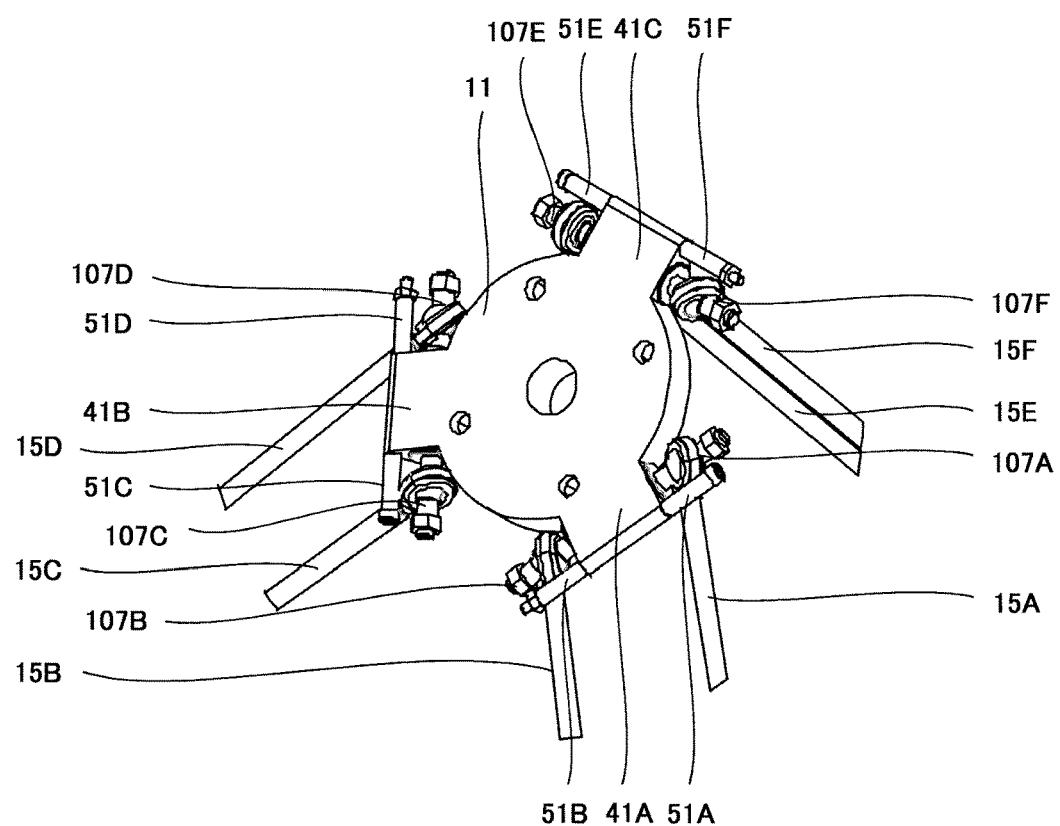
FIG. 19 is a perspective view illustrating the outline configuration near the movable part in the manipulating device illustrated in FIG. 13.

As illustrated in FIGS. 18 and 19, the movable part 11 is formed in a substantially disk shape, and plate-shaped protrusions 41A-41C are provided to a side surface of the movable part 11 so that they project in three directions.

The link part 15A is rotatably connected with a central part of one side wall of the protrusion 41A through the first joint 107A. Moreover, the link part 15B is rotatably connected to a central part of the other side wall of the protrusion 41A through the first joint 107B.

The bar-shaped reversal preventing member 51A is provided to a tip-end part of one side wall of the protrusion 41A, and a bar-shaped reversal preventing member 51B is provided to a tip-end part of the other side wall of the protrusion 41A.

The reversal preventing member 51A is configured to prevent a reversal of the link part 15A by contacting the link part 15A. Similarly, the reversal preventing member 51B is configured to prevent a reversal of the link part 15B by contacting the link part 15B.

Here, the "reversal of the link part" refers to that, as the link part rotates, an angle formed by this link part and the movable part 11 becomes larger than 180°. Note that, when the grip part 12 is in the initial state (at the origin), suppose that the angle formed by the link part and the movable part 11 is less than 180°.

Similarly, the link parts 15C and 15D are rotatably connected with the central parts of both side walls of the protrusion 41B through the first joints 107C and 107D, respectively. Bar-shaped reversal preventing members 51C and 51D are provided to tip-end parts of both the side walls of the protrusion 41B. Moreover, the link parts 15E and 15F are rotatably connected with central parts of both side walls of the protrusion 41C through the first joints 107E and 107F, respectively. Bar-shaped reversal preventing members 51E and 51F are provided to tip-end parts of both the side walls of the protrusion 41C.

Note that, in Embodiment 2, although the reversal preventing members 51A-51F are provided to the respective link parts 15A-15F, it is not limited to this configuration. The reversal preventing member may be provided at least one of the link parts 15A-15F, or the reversal preventing member may not be provided to all of the link parts.

Even by the manipulating device 100 according to Embodiment 2 configured in this way, similar operation and effects to the manipulating device 100 according to Embodiment 1 can be obtained.

Moreover, in the manipulating device 100 according to Embodiment 2, the roller parts 171B and 172B are provided to the arm part 14B, and the roller guide part 173A on which the roller parts 171B and 172B move is provided to the arm part 14A.

Thus, even if the arm part 14A or the arm part 14B is bent by the first holding force of the first connecting member 105A, the roller parts 171B and 172B move along the roller guide part 173A to prevent the arm part 14A and the arm part 14B contact and slide on each other.

Moreover, if the stepped parts 174A and 175A are provided to the roller guide part 173A, the roller parts 171B and 172B must overcome the stepped parts 174A and 175A in order for the arm part 14B to pivot independently from the arm part 14A. Therefore, the first holding force can be reduced, as compared with the case where the stepped parts 174A and 175A are not provided.

Further, in the manipulating device 100 according to Embodiment 2, the reversal preventing members 51A-51F are provided to the movable part 11 for the respective link parts 15A-15F.

Therefore, the reversal of each link part can be prevented. Moreover, the operator can easily understand an operating range of the user interface 102 by the link part contacting the reversal preventing member. Therefore, the operator can concentrate on the operation of the robot 200, and thereby the work efficiency is improved.

Embodiment 3

In the manipulating device according to Embodiment 1 (including modifications) or Embodiment 2, the manipulating device according to Embodiment 3 is further provided with a second connecting member which connects the arm part with the base part.

Below, one example of the manipulating device according to Embodiment 3 is described with reference to FIG. 20.

[Configuration of Manipulating Device]

Figure 20:
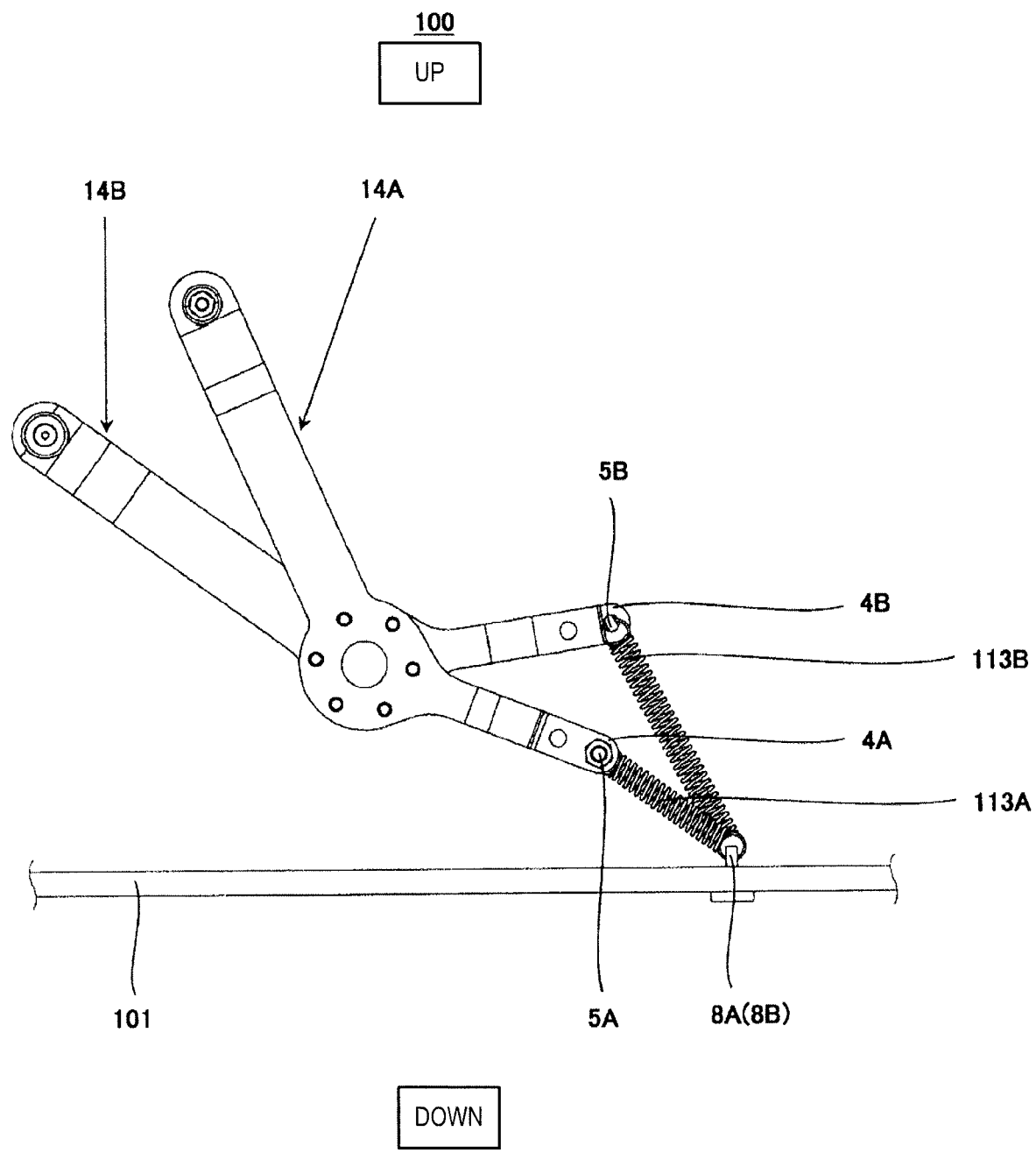
FIG. 20 is a schematic diagram illustrating an outline configuration of a substantial part of a manipulating device according to Embodiment 3.

FIG. 20 is a schematic diagram illustrating an outline configuration of a substantial part of the manipulating device according to Embodiment 3.

As illustrated in FIG. 20, although the manipulating device 100 according to Embodiment 3 is the same in the fundamental configuration as the manipulating device 100 according to Embodiment 1, it differs in that the second connecting member which connects the arm part with the base part 101 is provided.

In detail, the second connecting member 113A is rotatably connected at one end with the inward end part 4A of the arm part 14A through the first fastening member 5A, and the other end is rotatably connected with a suitable location of the base part 101 through a second fastening member 8A.

Similarly, the second connecting member 113B is rotatably connected at one end with the inward end part 4B of the arm part 14B through the first fastening member 5B, and the other end is rotatably connected with a suitable location of the base part 101 through the second fastening member 8B.

Note that, also in each of the arm parts 14C-14F, the second connecting member is provided, similar to the arm parts 14A and 14B.

The second connecting member is configured to prevent the user interface 102 from being lowered from the origin by the weight of the user interface 102, etc. The second connecting member may be, for example, comprised of a tensile spring. In this case, a spring constant etc. may suitably be set so that the user interface 102 is not lowered from the origin by the weight of the user interface 102, etc. Moreover, the spring may be configured so as to be elastically deformed when the load more than the first holding force is applied. As configured in this way, the tensile spring can also function as the first connecting member.

Moreover, the second connecting member may be comprised of the driver. In this case, the controller 110 causes the driver to drive the user interface 102 so that the user interface 102 is not lowered from the origin by the weight of the user interface 102, etc.

Moreover, a torque sensor etc. may be provided to the output shaft of the driver. In this case, when the controller 110 determines that the load less than the first holding force is applied based on a torque value detected by the torque sensor etc., it causes the driver to drive one of the pair of arm parts so as to follow the operation of the other arm part. Moreover, when the controller 110 determines that the load more than the first holding force is applied, it causes the driver to drive the pair of arm parts so as to be operated independently.

Therefore, the driver can also function as the first connecting member.

Even by the manipulating device 100 according to Embodiment 3 configured in this way, similar operation and effects to the manipulating device 100 according to Embodiment 1 can be obtained.

It is apparent for a person skilled in the art that many improvements or other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

Since the manipulating device of the present disclosure can be reduced in the size as compared with the conventional manipulating device, it is useful for the field of industrial robots.

DESCRIPTION OF REFERENCE CHARACTERS

1A Bending Portion
1B Bending Portion
2A Through-Hole
3A Outward End Part
3B Outward End Part
4A Inward End Part
4B Inward End Part
5A First Fastening Member
5B First Fastening Member
6A Stop
7B Base End
8A Second Fastening Member
8B Second Fastening Member
9A Counter Weight
9B Counter Weight
11 Movable Part
12 Grip Part
12A Button
12B Button
14A Arm Part
14B Arm Part
14C Arm Part
14D Arm Part
14E Arm Part
14F Arm Part
15A Link Part
15B Link Part
15C Link Part
15D Link Part
15E Link Part
15F Link Part
16A Driver Body
26A Output Shaft
36A Casing
41A Protrusion
41B Protrusion
41C Protrusion
51A Reversal Preventing Member
51B Reversal Preventing Member
51C Reversal Preventing Member
51D Reversal Preventing Member
51E Reversal Preventing Member
51F Reversal Preventing Member
100 Manipulating Device
101 Base Part
102 User Interface
103A Parallel Link Mechanism
103B Parallel Link Mechanism
103C Parallel Link Mechanism
104A Position Sensor
104B Position Sensor
104C Position Sensor
104D Position Sensor
104E Position Sensor
104F Position Sensor
105A First Connecting Member
105B First Connecting Member
105C First Connecting Member
106A Driver
106B Driver
106C Driver
106D Driver
106E Driver
106F Driver
107A First Joint
107B First Joint
107C First Joint
107D First Joint
107E First Joint
107F First Joint
108A Second Joint
108B Second Joint
109A Wire
110 Controller
111A Supporting Member
111B Supporting Member
111C Supporting Member
111D Supporting Member
111E Supporting Member
111F Supporting Member
112A Supporting Member
113A Second Connecting Member
113B Second Connecting Member
120A Base Plate
121B Pulley
130A Bearing Member
130B Bearing Member
131A Bolt
132A Bearing Member
140A Belt Drive
141A First Pulley
142A Second Pulley
143A Belt
151A Hypoid Gear 152A Hypoid Pinion
161A First Shaft Member
162A Second Shaft Member
171B Roller Part
172B Roller Part
173A Roller Guide Part
174A Stepped Part
175A Stepped Part
200 Robot
201 Driver
202 Force Sensor
300 Robot System

What is claimed is:

1. A manipulating device comprising:
a base part;
a user interface disposed above the base part and including a movable part and a grip part;
three sets of parallel link mechanisms that couple the base part to the movable part with six degrees of freedom, and include a parallel link mechanism comprising:
a pair of arm parts including a first arm part and a second arm part, and
a pair of link parts;
a position sensor configured to detect a position of a base-end part of at least one arm part of the first arm part and the second arm part; and
a controller configured to control at least one of a position and a posture of a robot based on the position detected by the position sensor,
wherein:
the at least one arm part is rotatably connected at the base-end part to the base part,
at least one link part of the pair of link parts is rotatably connected at a base-end part to the at least one arm part, and is rotatably connected at a tip-end part to the movable part, and
the first arm part and the second arm part are connected with each other through a first connecting member that is configured to apply a given first holding force between the first arm part and the second arm part such that the second arm part is configured to operate so as to follow operation of the first arm part.

2. The manipulating device of claim 1, wherein when an operator operates the user interface to apply a load less than the first holding force to the first connecting member, the second arm part is configured to operate so as to follow operation of the first arm part, and when a load more than the first holding force is applied to the first connecting member, the first arm part and the second arm part are configured to operate independently.

3. The manipulating device of claim 1, further comprising a driver provided to the base-end part of the at least one arm part and configured to drive the at least one arm part,
wherein when executing a position control of the robot, the controller is configured to control the driver to drive the second arm part so as to follow the operation of the first arm part.

4. The manipulating device of claim 3, further comprising a switch configured to switch between the position control and a posture control of the robot.

5. The manipulating device of claim 1, wherein a reversal preventing member configured to prevent a reversal of the link part is provided to the movable part.

6. The manipulating device of claim 1, wherein a roller part is provided to one of the pair of arm parts, and a roller guide part is provided to the other arm part.

7. The manipulating device of claim 1, further comprising a second connecting member connecting the at least one arm part with the base part.

8. A manipulating device comprising:
a base part;
a user interface disposed above the base part and including a movable part and a grip part;
three sets of parallel link mechanisms that couple the base part to the movable part with six degrees of freedom, and include a parallel link mechanism comprising a pair of arm parts and a pair of link parts;
a position sensor configured to detect a position of a base-end part of at least one arm part of the pair of arm parts; and
a controller configured to control at least one of a position and a posture of a robot based on the position detected by the position sensor,
wherein:
the at least one arm part is rotatably connected at the base-end part to the base part,
at least one link part of the pair of link parts is rotatably connected at a base-end part to the at least one arm part, and is rotatably connected at a tip-end part to the movable part,
the pair of arm parts are connected with each other through a first connecting member having a given first holding force set beforehand, and
when an operator operates the user interface to apply a load less than the first holding force to the first connecting member, one arm part of the pair of arm parts is configured to operate so as to follow operation of the other arm part of the pair of arm parts, and when a load more than the first holding force is applied to the first connecting member, the one arm part and the other arm part are configured to operate independently.

* * * * *